United States Patent
Frykestig

(10) Patent No.: US 10,832,474 B1
(45) Date of Patent: Nov. 10, 2020

(54) SYSTEMS AND METHODS FOR PROVIDING A DISTRIBUTED TETRAHEDRAL MESH

(71) Applicant: Ansys, Inc., Canonsburg, PA (US)

(72) Inventor: Jan Ivan Vilhem Frykestig, Torsby (SE)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 16/285,458

(22) Filed: Feb. 26, 2019

Related U.S. Application Data

(60) Provisional application No. 62/635,898, filed on Feb. 27, 2018.

(51) Int. Cl.
*G06T 17/20* (2006.01)
*G06T 1/20* (2006.01)

(52) U.S. Cl.
CPC .............. *G06T 17/205* (2013.01); *G06T 1/20* (2013.01)

(58) Field of Classification Search
None
See application file for complete search history.

(56) References Cited

U.S. PATENT DOCUMENTS

2008/0297507 A1* 12/2008 Chen .................. G06T 17/20
 345/424
2016/0378823 A1* 12/2016 Desai ............... G06F 16/24578
 707/718

OTHER PUBLICATIONS

Zhang ("A Parallel Algorithm for Adaptive Local Refinement of Tetrahedral Meshes Using Bisection") Numerical Mathematics : Theory, Methods and Applications Numer. Math. Theor. Meth. Appl., vol. 2, No. 1, pp. 65-89 (2009) (Year: 2009).*
Topping et al. ("Parallel and distributed adaptive quadrilateral mesh generation") Computers and Structures 73 (1999) 519±536 (Year: 1999).*

* cited by examiner

Primary Examiner — Yanna Wu
(74) Attorney, Agent, or Firm — Jones Day

(57) ABSTRACT

Systems and methods are provided for generating a tetrahedral mesh representation of a volumetric object. A triangular surface mesh is received that defines a volumetric region. In response to the receiving, a root box is divided into a plurality of partitions with subdivision planes separating adjacent partitions, the triangular surface mesh enclosed within the root box. The plurality of partitions are assigned to different ones of a plurality of mesh processors. A tetrahedral mesh is generated within each of the plurality of partitions. Tetrahedrals that intersect the subdivision planes separating adjacent partitions are deleted to define gap regions, and a conformal tetrahedral mesh representation of the volumetric object is generated, wherein each of the gap regions is filled with an additional tetrahedral mesh.

20 Claims, 39 Drawing Sheets

US 10,832,474 B1

SYSTEMS AND METHODS FOR PROVIDING A DISTRIBUTED TETRAHEDRAL MESH

CROSS-REFERENCE TO RELATED APPLICATIONS

This application claims priority to U.S. Provisional Application No. 62/635,898, filed Feb. 27, 2018, entitled "Systems and Methods for Providing a Distributed Tetrahedral Mesh," the entirety of which is herein incorporated by reference.

TECHNICAL FIELD

The technology described herein relates generally the generation of meshes within a computer-aided modeling environment.

BACKGROUND

Meshing technologies can be used in modeling a variety of physical phenomena, including solid mechanics, fluid flows, and/or electromagnetics. A tetrahedral (e.g., a mesh made up of tetrahedrons—triangular pyramids) mesh is a type of meshing technology that is often used to model three-dimensional objects.

SUMMARY

Systems and methods are provided for generating a tetrahedral mesh representation of a volumetric object. A triangular surface mesh is received that defines a volumetric region. In response to the receiving, a root box is divided into a plurality of partitions with subdivision planes separating adjacent partitions, the triangular surface mesh being enclosed within the root box. The plurality of partitions are assigned to different ones of a plurality of mesh processors. A tetrahedral mesh is generated within each of the plurality of partitions. Tetrahedrals that intersect the subdivision planes separating adjacent partitions are deleted to define gap regions, and a conformal tetrahedral mesh representation of the volumetric object is generated, wherein each of the gap regions is filled with an additional tetrahedral mesh.

In another example, a system for generating a tetrahedral mesh representation of a volumetric object includes a primary mesh processor. The primary mesh processor is configured to receive a triangular surface mesh that defines a volumetric region, automatically divide a root box into a plurality of partitions with subdivision planes separating adjacent partitions, and assign the plurality of partitions to different ones of a plurality of mesh sub-processors. The plurality of mesh sub-processors are in communication with the primary mesh processor, the plurality of mesh sub-processors are configured to receive the plurality of partitions from the primary mesh processor, generate a tetrahedral mesh within each of the plurality of partitions, delete tetrahedrals that intersect the subdivision planes separating adjacent partitions to define gap regions, and fill each of the gap regions with an additional tetrahedral mesh to generate a conformal tetrahedral mesh representation of the volumetric object.

DETAILED DESCRIPTION

A tetrahedral mesh may be generated from an input comprising a volumetric region defined by a watertight triangular surface mesh. The systems and methods described herein may, for example, be used to subdivide a triangular surface mesh for a volumetric region into separate pieces that are meshed in parallel by a set of computers that interact via messages to generate a conformal mesh volume of tetrahedrons (e.g., a mesh where each pair of adjacent elements (edges or nodes) intersect at a point or edge).

Figure 1:
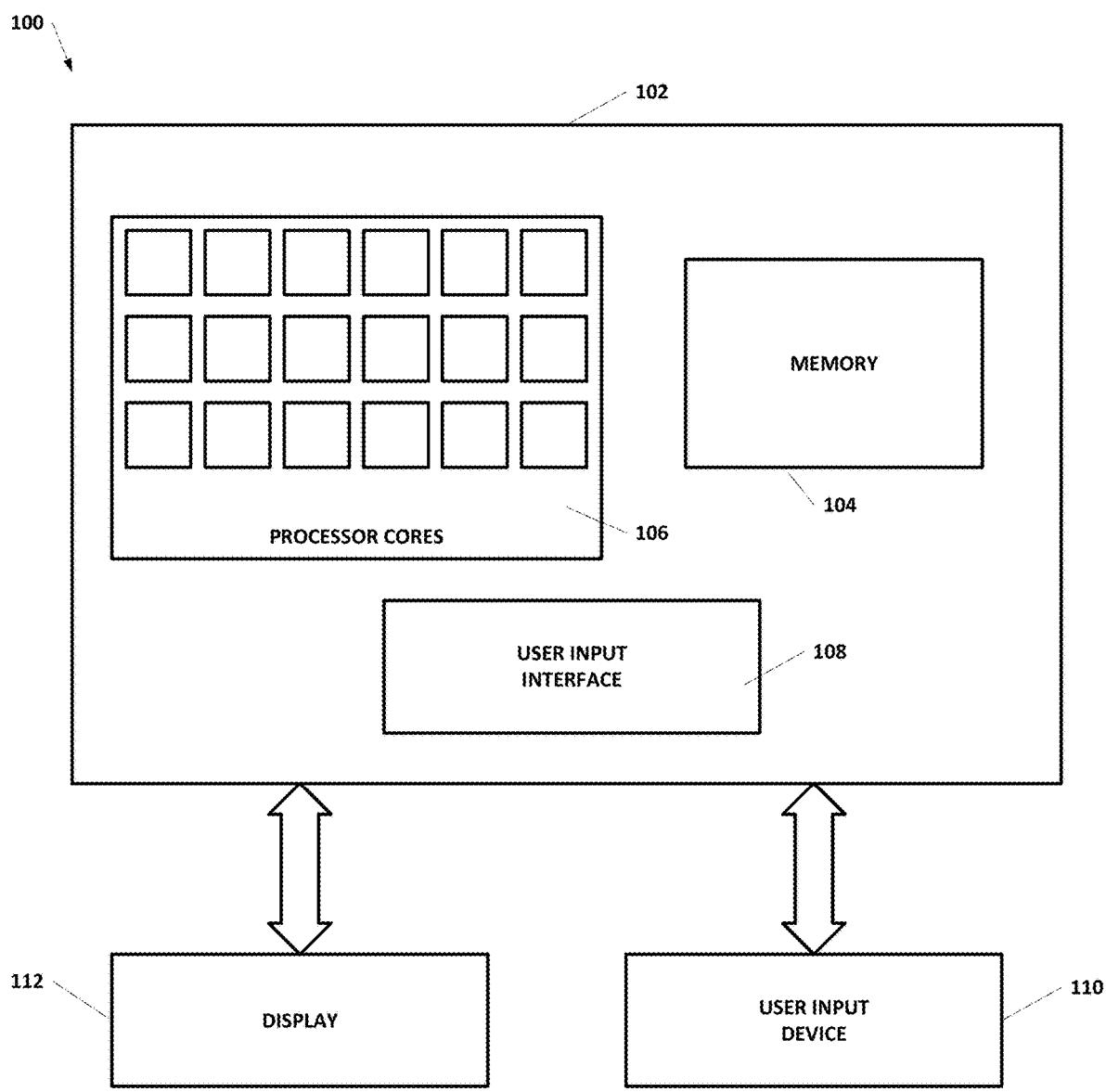
FIG. 1 is a block diagram illustrating an example system for generating a tetrahedral mesh.

FIG. 1 is a block diagram of an example system 100 that may be used to generate a tetrahedral mesh. The system 100 includes a computing device(s) 102 having a memory 104 and a plurality of data processor/processor cores 106. The computing device(s) 102 also includes a user input interface 108 that can receive instructions provided by a user input device 110 and/or via a graphical user interface. The example system 100 also includes a display 112 that can render visual information that corresponds to a rendered tetrahedral mesh of a modeled object.

Figure 2:
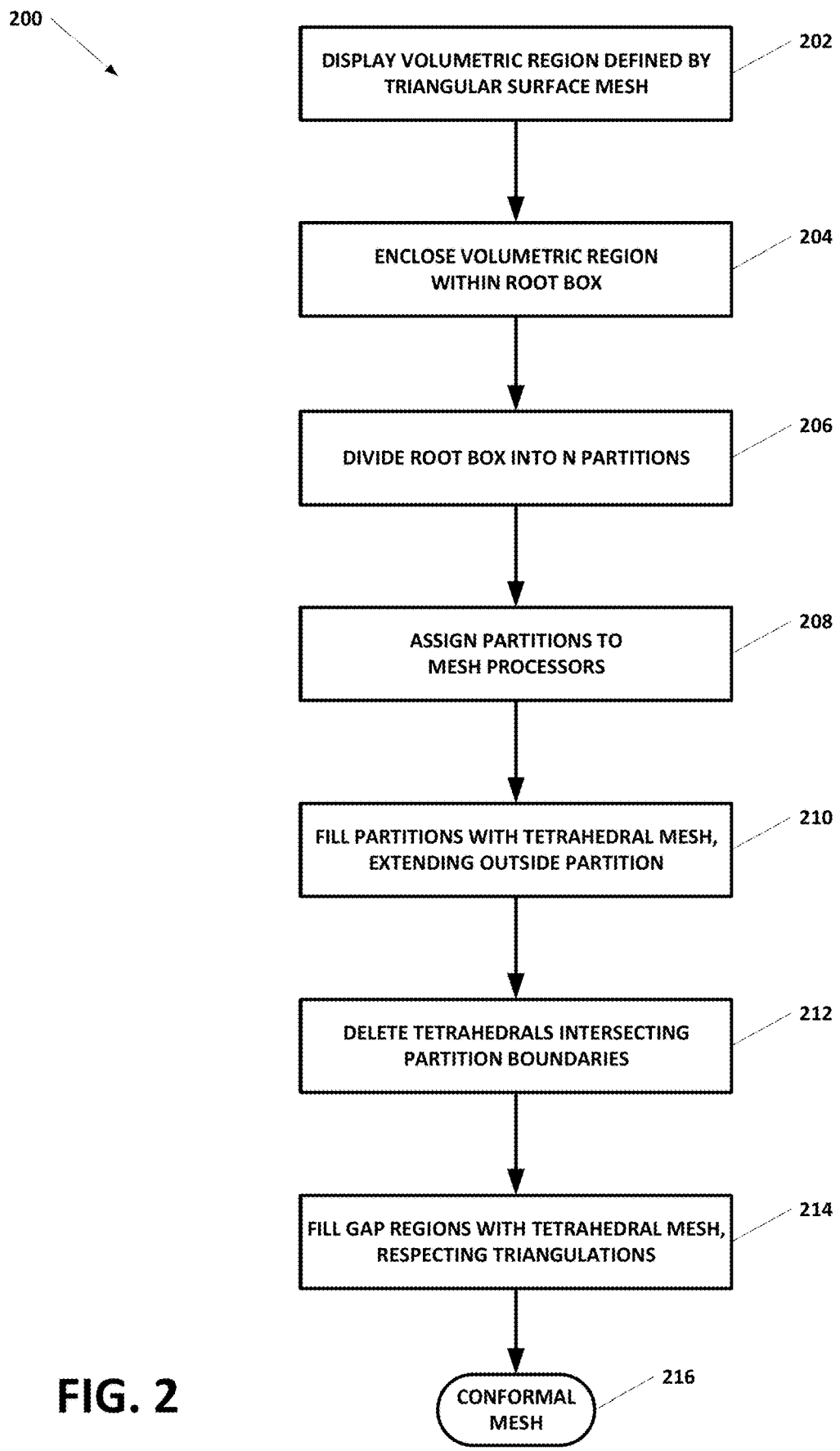
FIG. 2 is a flow diagram of an example method for generating tetrahedral mesh.

FIG. 2 is a flow diagram illustrating an example method 200 for generating a tetrahedral mesh. The example method 200 in FIG. 2 is described below with reference to a two-dimensional example set forth in FIGS. 3-9. That two-dimensional example is provided in FIGS. 3-9 to help easily visualize the example operations set forth in FIG. 2. It should be understood, however, that the example method 200 set forth in FIG. 2 is not limited to a two-dimensional mesh, but extends to the generation of three-dimensional tetrahedral meshes.

At 202 in FIG. 2, a volumetric region that is to be converted into a tetrahedral mesh is displayed. The volumetric region may, for example, be a three-dimensional (3D) model of a physical object, created using one or more computer-aided design (CAD) tools, and rendered on a computer display, such as display 112 in FIG. 1. The volumetric region may, for example, be defined by a triangular surface mesh created using a computer aided engineering (CAE) software application, such as ANSA, Ansys Meshing, GAMBIT, CATIA®, I-DEAS®, PATRAN®, Pro/ENGINEER®, Hypermesh®, or others.

Figure 3:
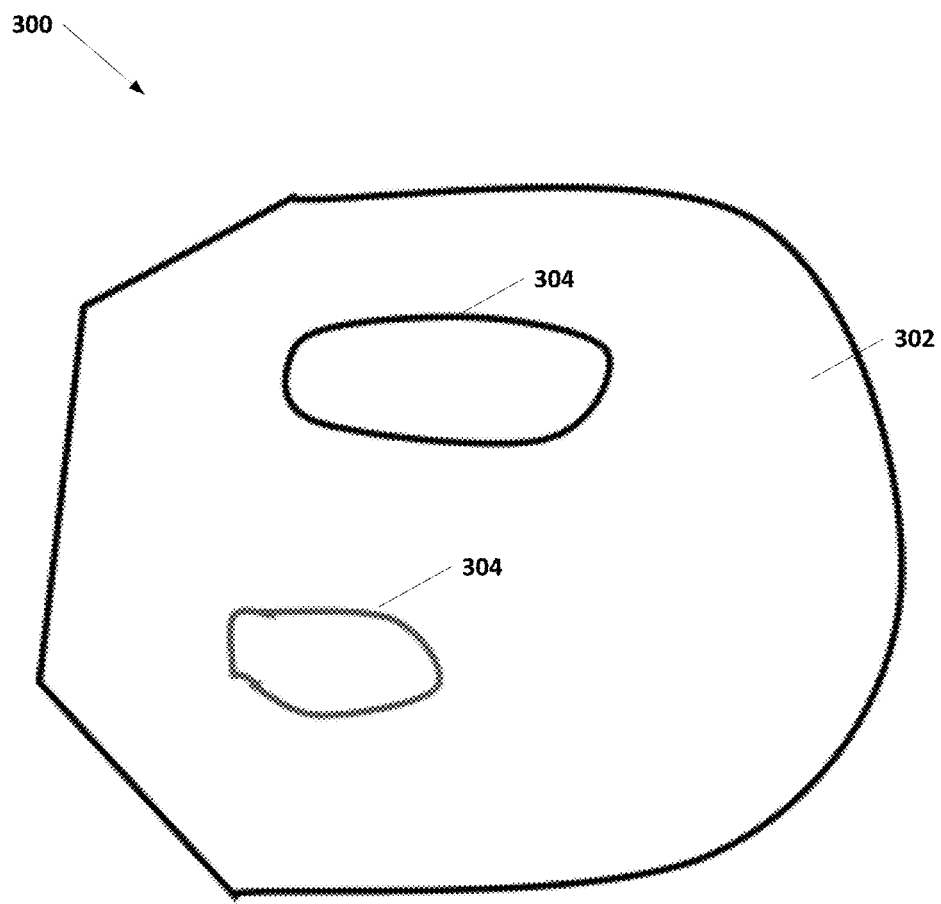
FIGS. 3-9 depict an example of tetrahedral mesh generation.

A two-dimensional representation of an example surface mesh 300 of a three-dimensional object is illustrated in FIG. 3. The example shown in FIG. 3 includes a surface mesh 302 defining a volumetric region having two holes 304 (i.e., voids) within an interior area of the region. Three-dimensional objects having interior geometric features, such as the voids 304 shown in FIG. 3, are often difficult to represent as a tetrahedral mesh using traditional techniques because of the difficulty in subdividing an arbitrary object such that each piece can be meshed.

Figure 4:
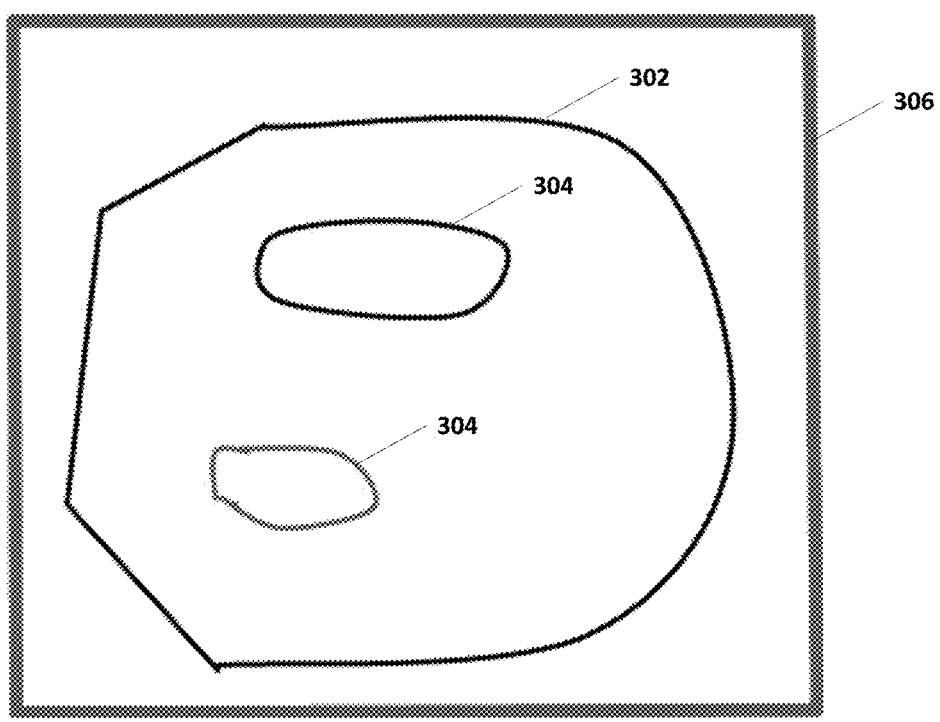

At 204 in FIG. 2, the three-dimensional object to be meshed is enclosed within a graphical box, referred to herein as a root box. The root box may, for example, be created from user input received by a mesh processing unit, such as the user input device 110 and one or more of the processor cores 106 shown in FIG. 1. An example is illustrated in FIG. 4. In FIG. 4, the example surface mesh 302 is surrounded by a root box 306. As illustrated, the root box 306 completely encloses the entire three dimensional object 302 to be meshed.

Figure 5:
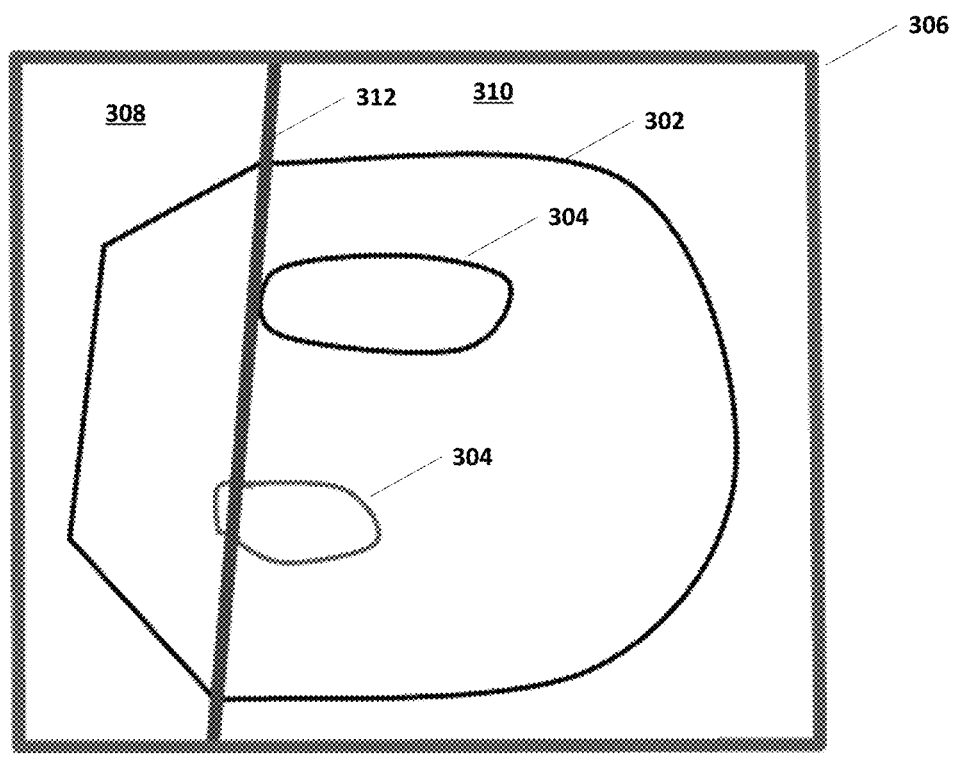

At 206 in FIG. 2, the root box and the enclosed three-dimensional geometry are divided into a number (N) of partitions. In embodiments, the number (N) of partitions that the root box is divided into may be arbitrary. For example, a mesh processing unit, such as one or more of the processor cores 106 shown in FIG. 1, may automatically divide the root box into an arbitrary number of partitions. An example is illustrated in FIG. 5. FIG. 5 shows the example root box 306 and enclosed three-dimensional geometry 302 divided into two partitions 308, 310 by a subdivision surface (e.g., plane) 312. It should be understood that the subdivision surface 312 is shown as a line in the two-dimensional example of FIG. 5, but would be a planar surface if shown in three dimensions. It should also be understood that the illustrated example includes only two partitions for simplicity, but actual embodiments would typically include many more partitions. It should be further understood that many examples disclosed herein show linear or planar subdividing surfaces, but other examples may include differently-shaped (e.g., non-planar) subdividing surfaces.

Figure 6:
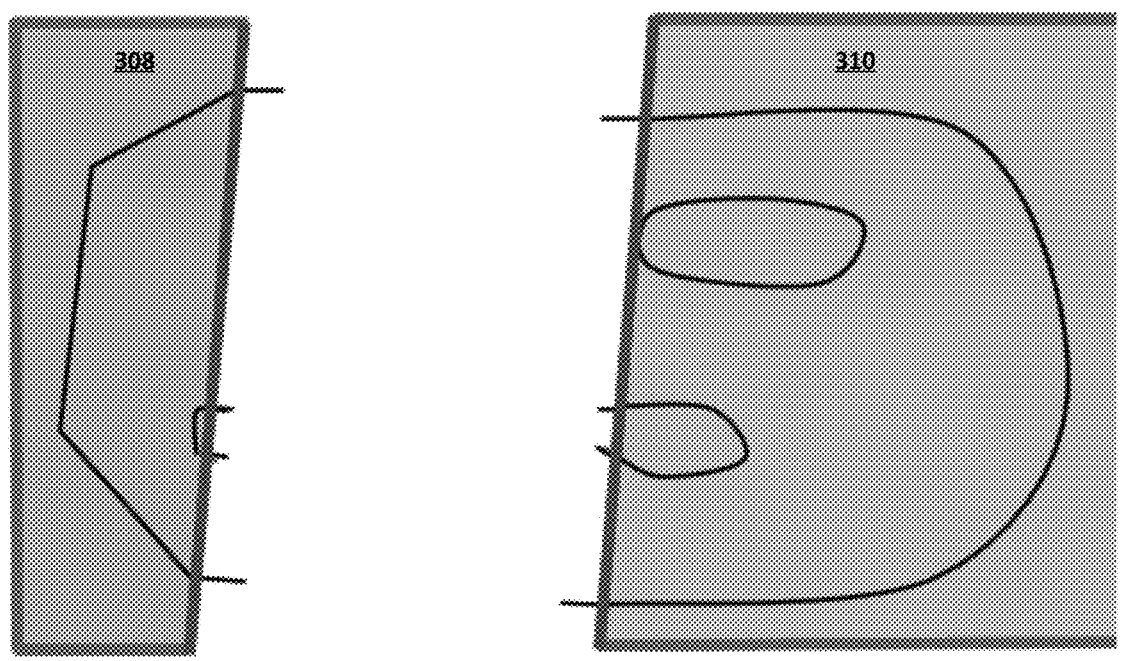

At 208 in FIG. 2, each of the N partitions are assigned to a mesh processor. In embodiments, each mesh processor in the system, such as the processor cores 106 illustrated in FIG. 1, may have the same status and work together in parallel. In other embodiments, the processor cores 106 may include a primary mesh processing unit and a plurality of mesh processors, and the primary mesh processing unit may assign each of the partitions to a mesh processor for parallel processing. In embodiments, each partition may be assigned to a different mesh processor, but in other embodiments a single mesh processor may be assigned more than one partition. FIG. 6 illustrates two example partitions 308, 310, where one partition 308 is assigned to a first mesh processor and the other partition 310 is assigned to a second mesh processor. FIG. 6 illustrates the subdivision of a surface mesh into two partitions, where the partitions 308, 310 include surface-mesh regions that extend across the boundary of the partition. This is because the surface-mesh may extend beyond the partition boundary (i.e., with an individual triangle at the boundary being partly inside of the partition and partly outside of the partition.)

Figure 7:
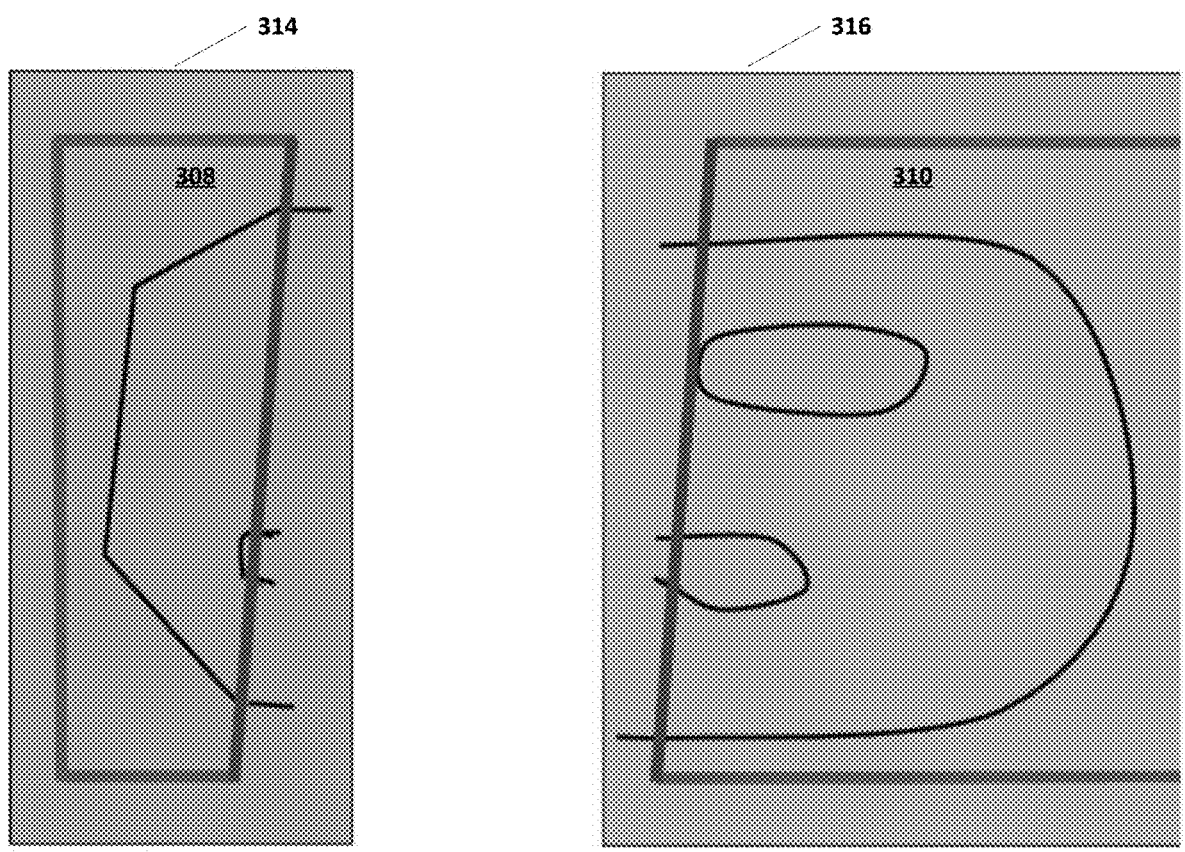

At 210 in FIG. 2, each partition is filled with a tetrahedral mesh by its respective mesh processor. For each partition, a tetrahedral mesh that completely covers the partition is created by extending the mesh outside of the partition. That is, in embodiments, the tetrahedral mesh is not forced to coincide with the subdivision plane(s), but is to extend outside of the partition region. In this way, there should be no proximity problem, nor should there be any need for modification of the surface mesh. An example is shown in FIG. 7. FIG. 7 shows tetrahedral mesh regions 314, 316 that completely cover and extend beyond partitions 308, 310, respectively. In this way, the regions 314, 316 bound the entire tetrahedral mesh, including boundary triangles that may extend beyond the partition boundaries. In the illustrated example, a first tetrahedral mesh region 314 is created by a first mesh processor to surround partition 308, and a second tetrahedral mesh region 316 is created by a second mesh processor to surround partition 310. The tetrahedral mesh for each partition may, for example, be created by mesh processors using a tetrahedral meshing software application, such as Ansys Fluent.

With reference again to FIG. 2, the partition meshes created at step 210 are non-conformal. That is, the tetrahedral meshes for each partitions are not connected to represent a single three-dimensional geometry. At 212 and 214, the meshes for each partition are connected to yield a conformal tetrahedral mesh 216. The mesh is made conformal by extracting a region for each partition bordering a partition's surface (i.e., bordering a subdivision plane(s)). The region for each partition is defined by deleting those tetrahedral cells that intersect the subdivision plane(s). Triangles of the defining surface mesh are kept. As a result, a region is defined along the partition surface that is empty but for any triangle used for discretization of the original geometry.

At 212, the tetrahedrals within each partition that are touching or intersecting a subdivision plane (i.e., a partition boundary) are deleted. Any triangles defining the original surface mesh (displayed at 202) are kept (i.e., not deleted), even if they intersect a subdivision plane. The result of 212 is a non-conformal mesh with one or more regions (i.e., gaps) between adjacent partitions that are empty except for any triangles from the original surface mesh.

At 214, the gaps created between adjacent partitions are filled with a tetrahedral mesh, respecting any triangulations from the original surface mesh. The result of 214 is a conformal tetrahedral mesh 216, which may, for example, be rendered and displayed by display 112 of FIG. 1.

Figure 8:
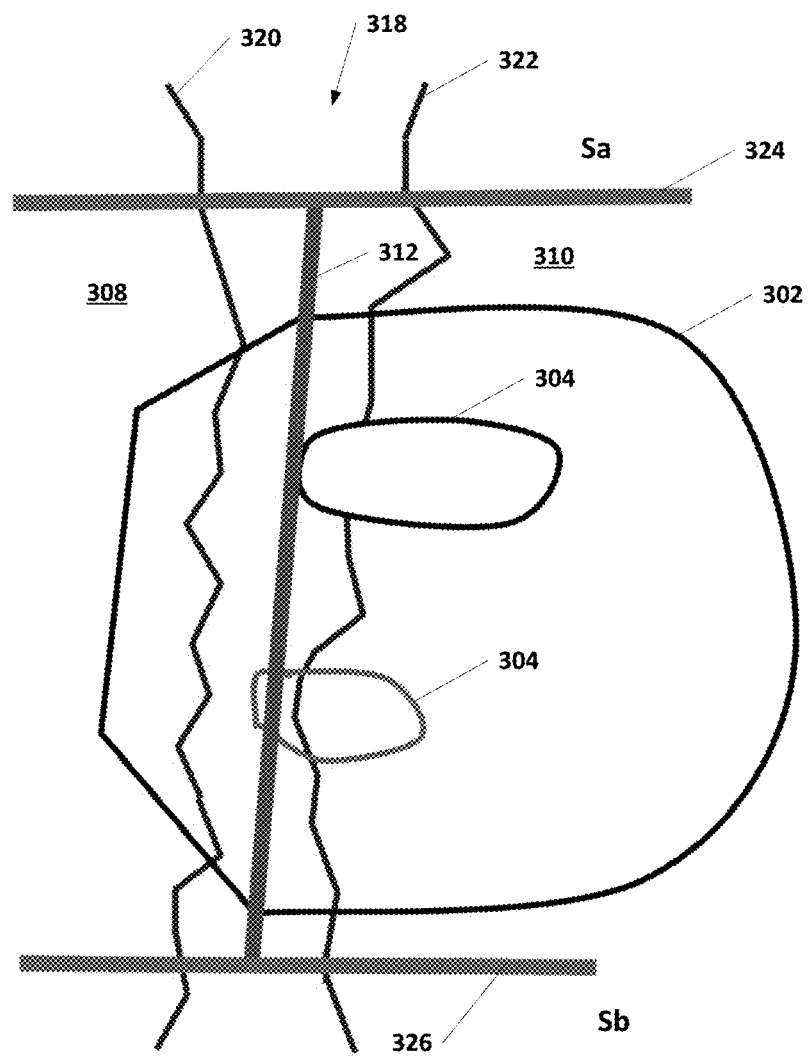
Figure 9:
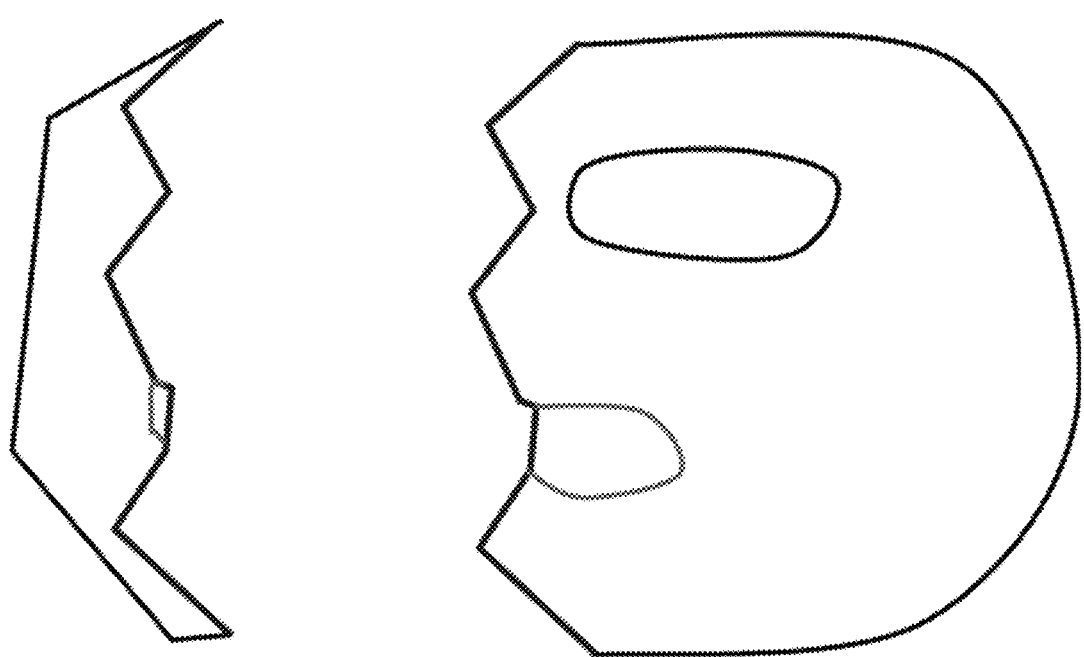

An example of the boundary extraction and gap filling process is illustrated by FIGS. 8 and 9. FIG. 8 shows the two example partitions 308, 310 on each side of a subdivision plane 312. The tetrahedrals within each partition (created in FIG. 7) that are touching or intersecting the subdivision plane 312 are deleted. Any triangles defining the surface mesh 302, 304 are kept, including where they intersect the subdivision plane. The result is a non-conformal mesh with a gap region 318 defined between two non-linear boundaries 320, 322 that is empty expect for any portions of the original surface mesh 302, 304.

The gap region 318 is enclosed in a larger box by subdivision surfaces (Sa, Sb) 324, 326, and the resulting gap domain is filled with a tetrahedral mesh, respecting the triangulations from the surface mesh 302, 304. A triangle may then be identified within the gap domain (i.e., within the region bounded by the subdivision surfaces 324, 326 and the non-linear partition boundaries 320, 322. Once such a triangle is identified, the gap domain is flood filled with a tetrahedral mesh, following the rule that a neighboring tetrahedral is added unless the tetrahedral side is outside of any gap domain boundary. Once all connections are made, there will be a conformal mesh, extending outside of the box enclosing the three-dimensional geometry that was created at 204 in FIG. 2. Starting from one outermost face, the tetrahedral mesh outside of the three-dimensional geometry may be identified and removed by flood-filling. The result is a conformal tetrahedral mesh, as shown in FIG. 9.

With reference again to FIG. 2, in certain embodiments, the operations at 214 may be performed by a subset of mesh processors. For example, mesh processors for adjacent partitions may share information such that one mesh processor may perform the gap filling operations for both of the adjacent partitions. An example is illustrated in FIG. 10.

Figure 10:
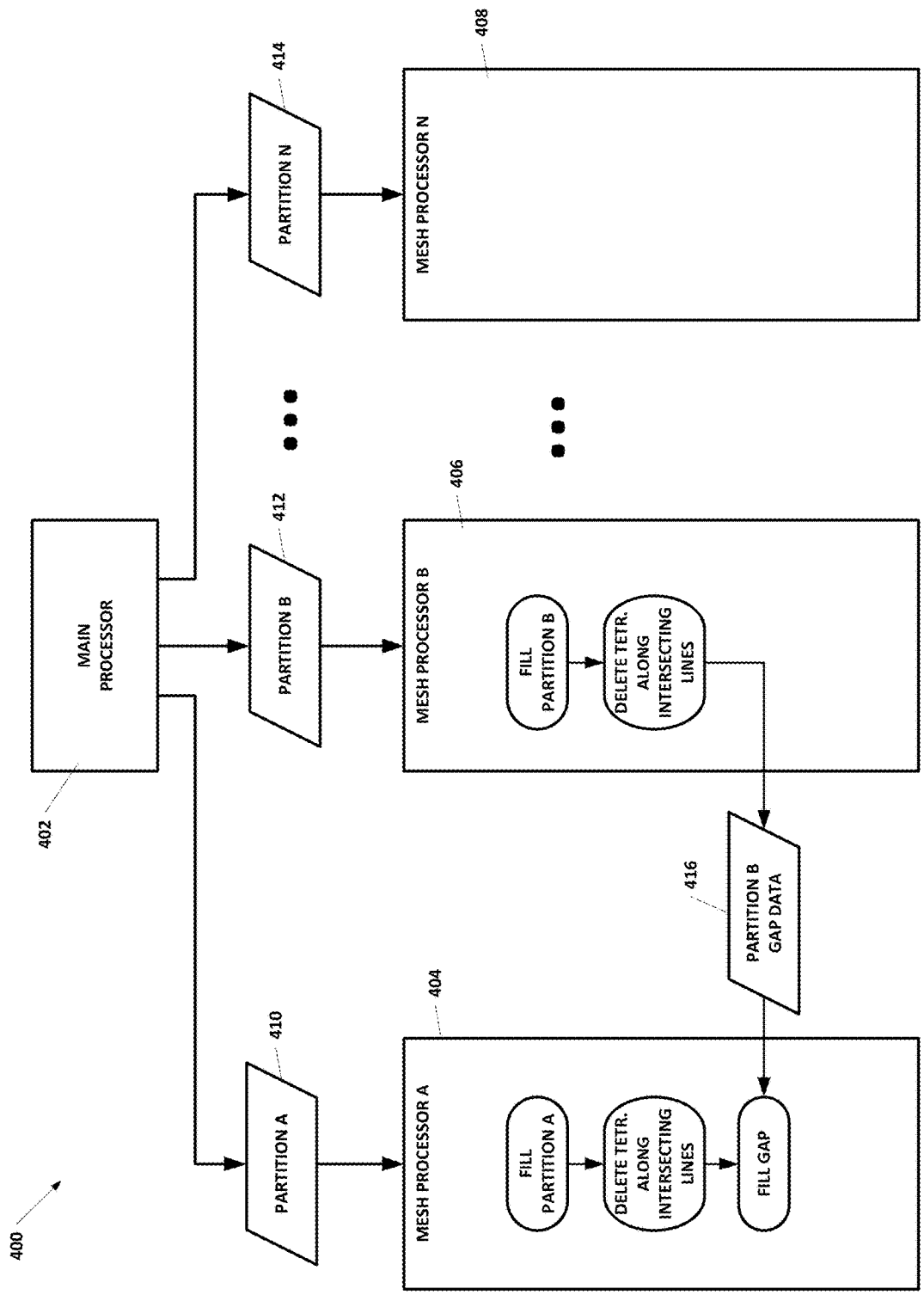
FIG. 10 is a block diagram illustrating an example of a distributed system for generating a tetrahedral mesh.

FIG. 10 shows an example of a system 400 for creating a tetrahedral mesh representation of a three-dimensional object. The system 400 includes a plurality of mesh processors 404, 406, 408. The plurality of mesh processors 404, 406, 408 communicate by sending and receiving data over a bus and/or over one or more computer networks. In one example, there may be an assigned main processor 402 that communicates with mesh processors 404, 406, 408, for example within the system 102 shown in FIG. 1. In other examples, however, the mesh processors 404, 406, 408 may be processors in a distributed system that communicate over a computer network, or may be processors within a cloud computing network.

In operation, the plurality of mesh processors 404, 406, 408 each receive a part of the surface mesh. In cooperation, the plurality of mesh processors 404, 406, 408 create a root box that encloses the complete surface mesh. Thereafter, the mesh processors 404, 406, 408 reassign mesh triangles such that each mesh processor 404, 406, 408 is assigned mesh triangles in a specific region of space (i.e., a partition). In other examples, a main processor 402 may be assigned, where the main processor 402 receives a surface mesh of the object, encloses the surface mesh within a root box, and divides the root box into multiple partitions 410, 412, 414, for example as described above with reference to operations 202, 204 and 206 of FIG. 2. As shown in FIG. 10, each partition 410, 412, 414 is assigned by the main processor 402 to one of the mesh processors 404, 406, 408 for parallel processing.

Each mesh processor 404, 406, 408 encloses its respective partition with a tetrahedral mesh. Next, partitions are connected across partition sub-division planes. All mesh processors sharing a plane take part in the connection, and one of the mesh processors is assigned as master, i.e., the mesh processor that will fill the sub-regions. For example, in FIG. 6, a mesh processor assigned to region 308 may be assigned as the master. Each mesh processor deletes any tetrahedral cells intersecting a subdivision plane, for example as described above with reference to operations 210 and 212 of FIG. 2. For instance, in the example illustrated in FIG. 10, data 416 sufficient to define the gap region in partition B 412 is transferred from mesh processor B 406 to mesh processor A 404. Mesh processor A 404 is then able to perform the gap filling operations for the gap region between partitions A and B 410, 412, for example as described above with reference to operation 214 of FIG. 2. The triangles exposed from the deletion of tetrahedral cells, (e.g., 322 in FIG. 8 if the mesh processor assigned to region 308 is the master) are transferred to the master mesh processor. Note that more than two mesh processors may share a plane and participate in the connection procedure.

More specifically, each mesh processor 404, 406, 408 encloses its respective partition with a tetrahedral mesh. Partitions are then connected across partition sub-division plans, with the mesh processors sharing a common partition boundary taking part in the connection, and with one mesh processor operating as master (i.e., the mesh processor that fills the sub-regions). That is, each mesh processor 404, 406, 408 deletes any tetrahedral cells intersecting its partition boundary(s), and the master processors fill the resulting gap regions with tetrahedral mesh. For instance, referring to the example shown in FIG. 8, a mesh processor for partition 308 may be assigned as the master for the purpose of filling the gap region 318.

It should be understood that although the examples illustrated herein show only two partitions sharing a common partition boundary, other examples may include more than two partitions (e.g., each assigned to a different mesh processor) having a common partition boundary.

FIGS. 11-23 illustrate another example of a tetrahedral mesh created using the systems and methods described herein. The example tetrahedral mesh illustrated by the three-dimensional drawings shown in FIGS. 11-23 may, for example, be generated using the method described above with reference to FIG. 2. FIGS. 11-23 are included to aid in understanding by providing a three-dimensional example in addition to the two-dimensional example shown in FIG. 3-9.

Figure 11:
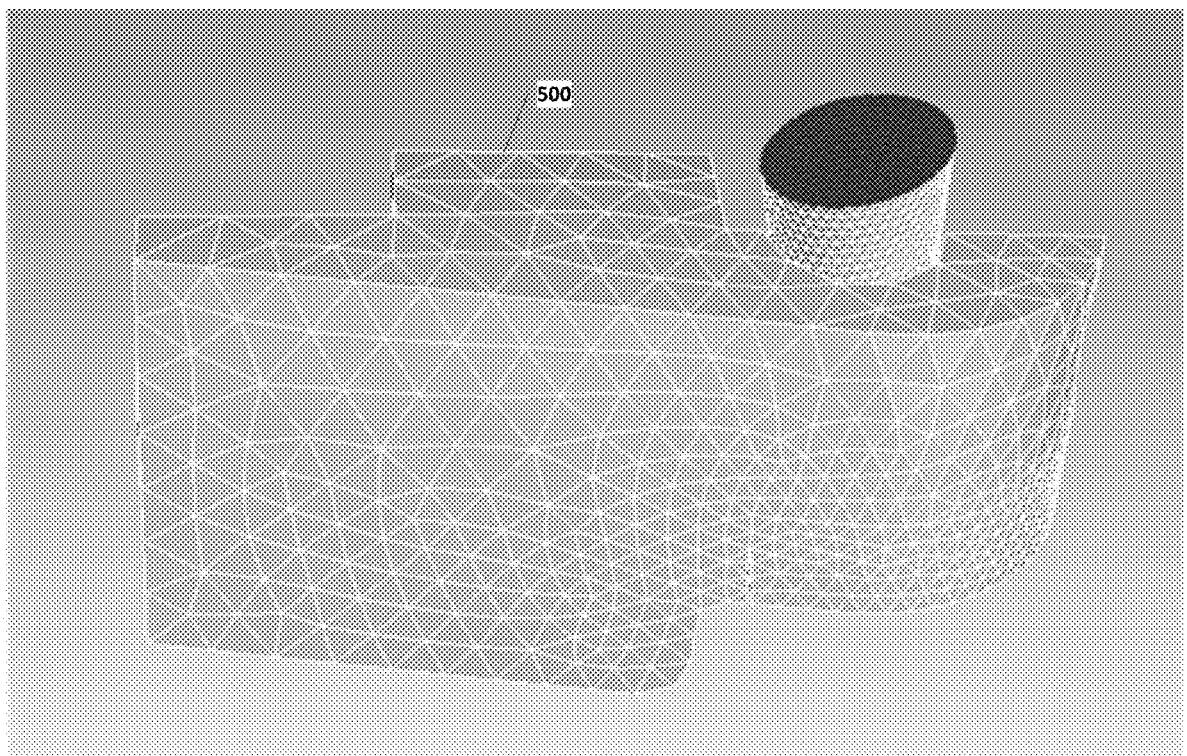
FIGS. 11-23 illustrate another example of tetrahedral mesh generation.
Figure 12:
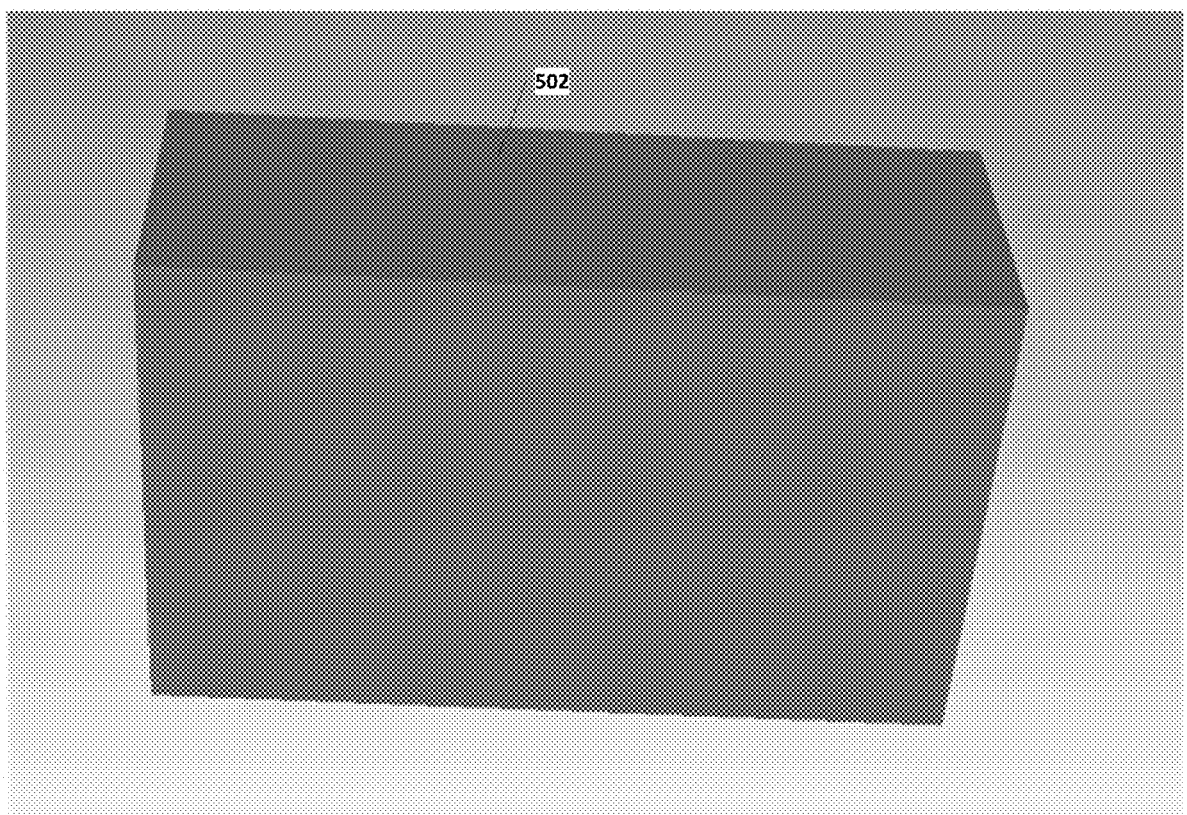
Figure 13:
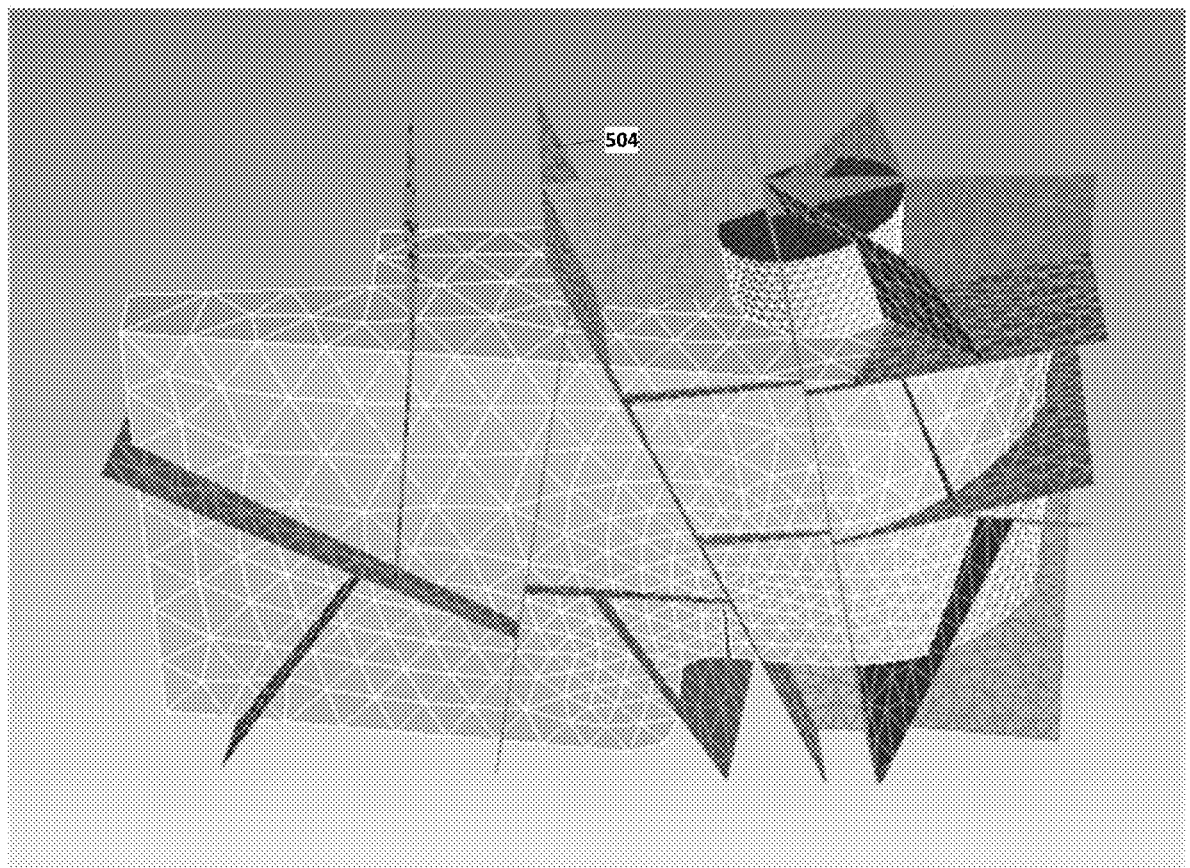
Figure 14:
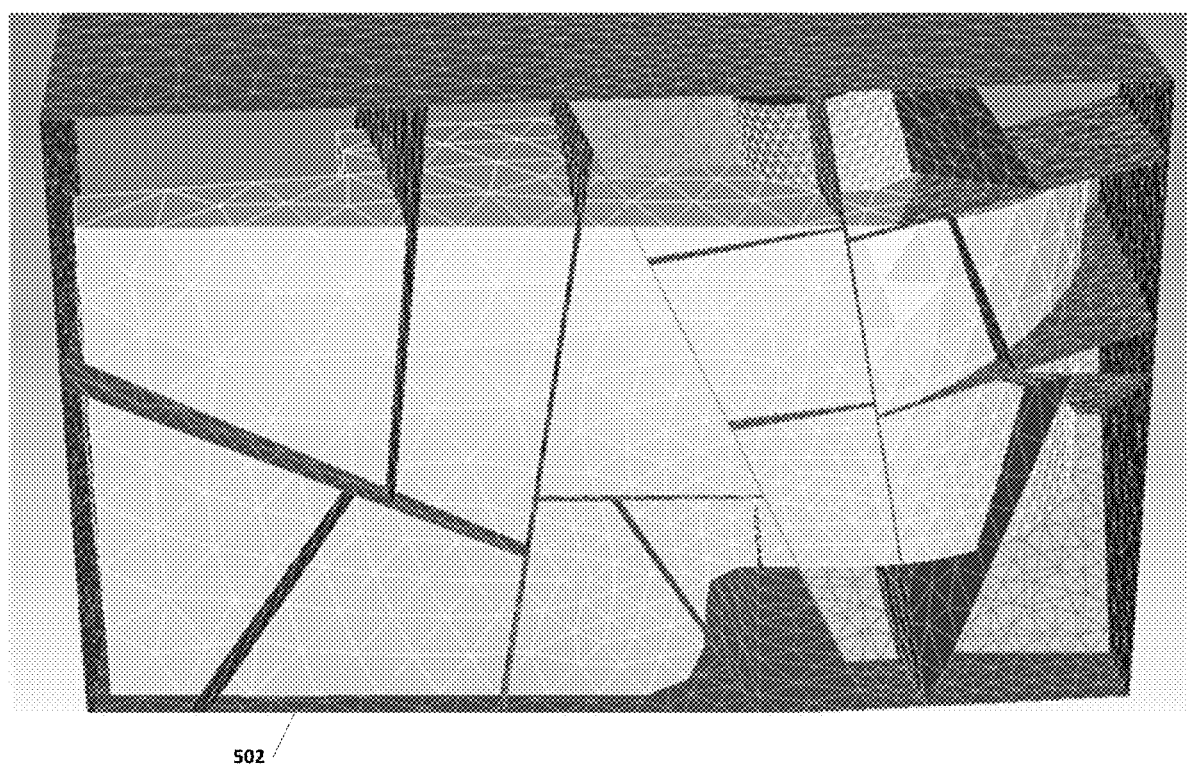
Figure 15:
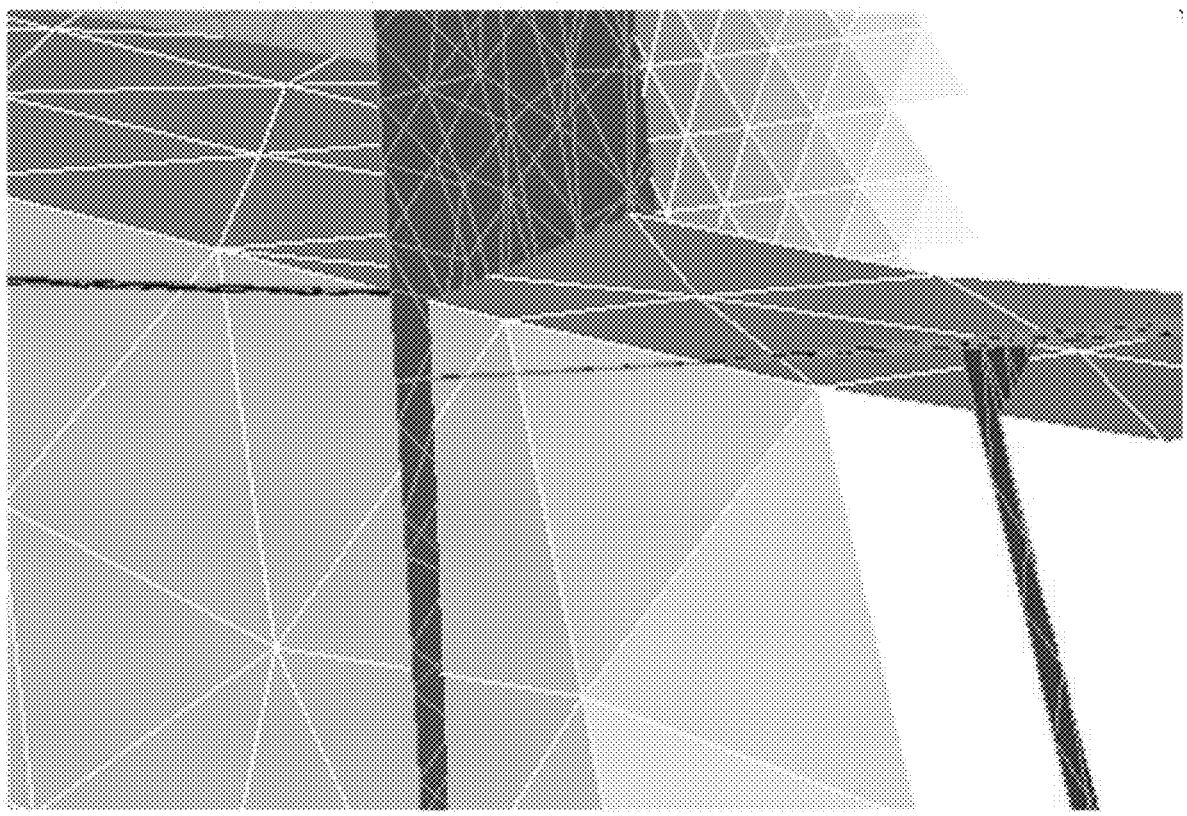
Figure 16:
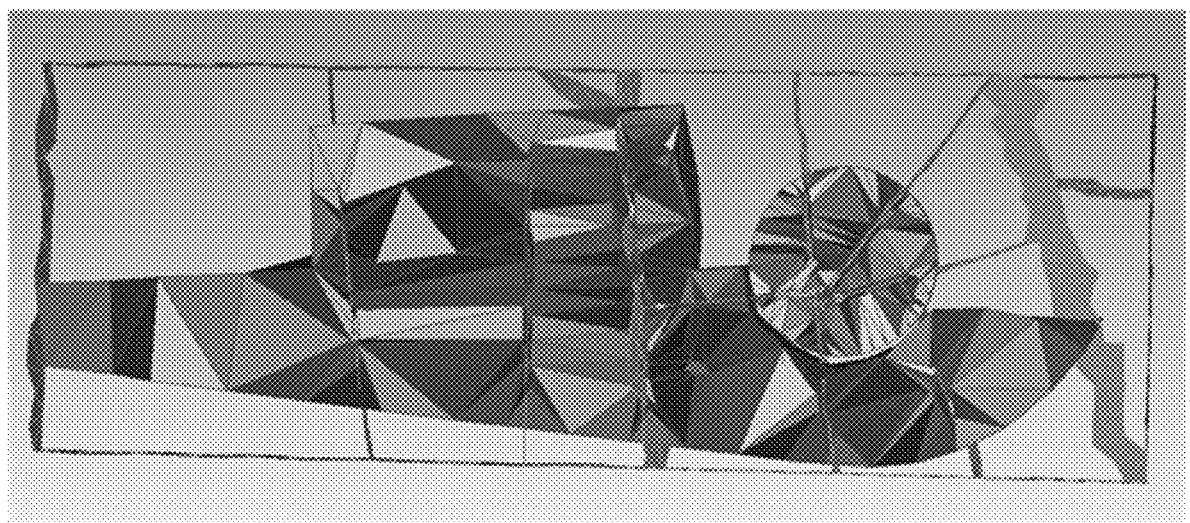
Figure 17:
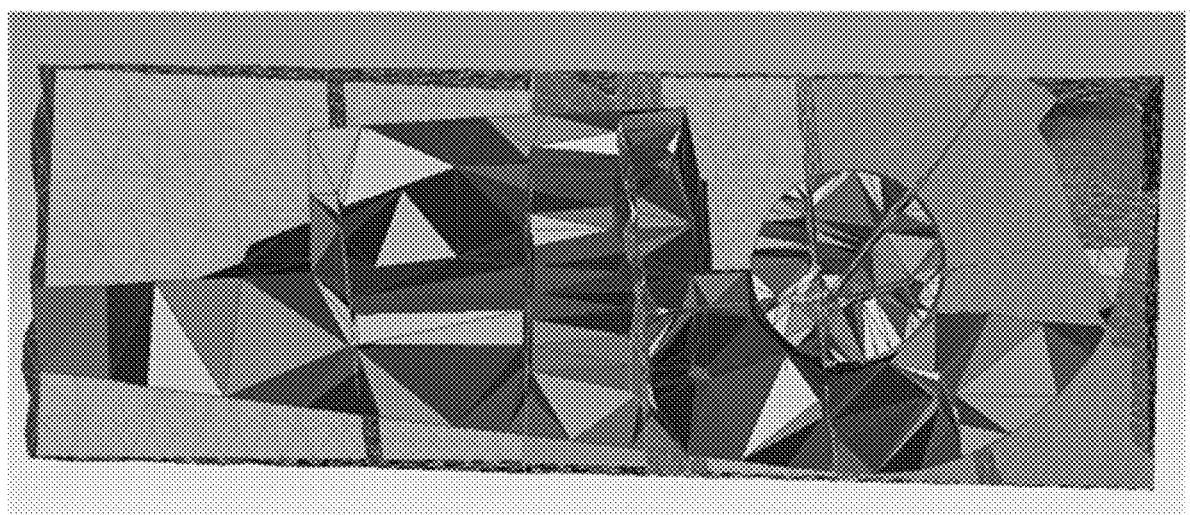
Figure 18:
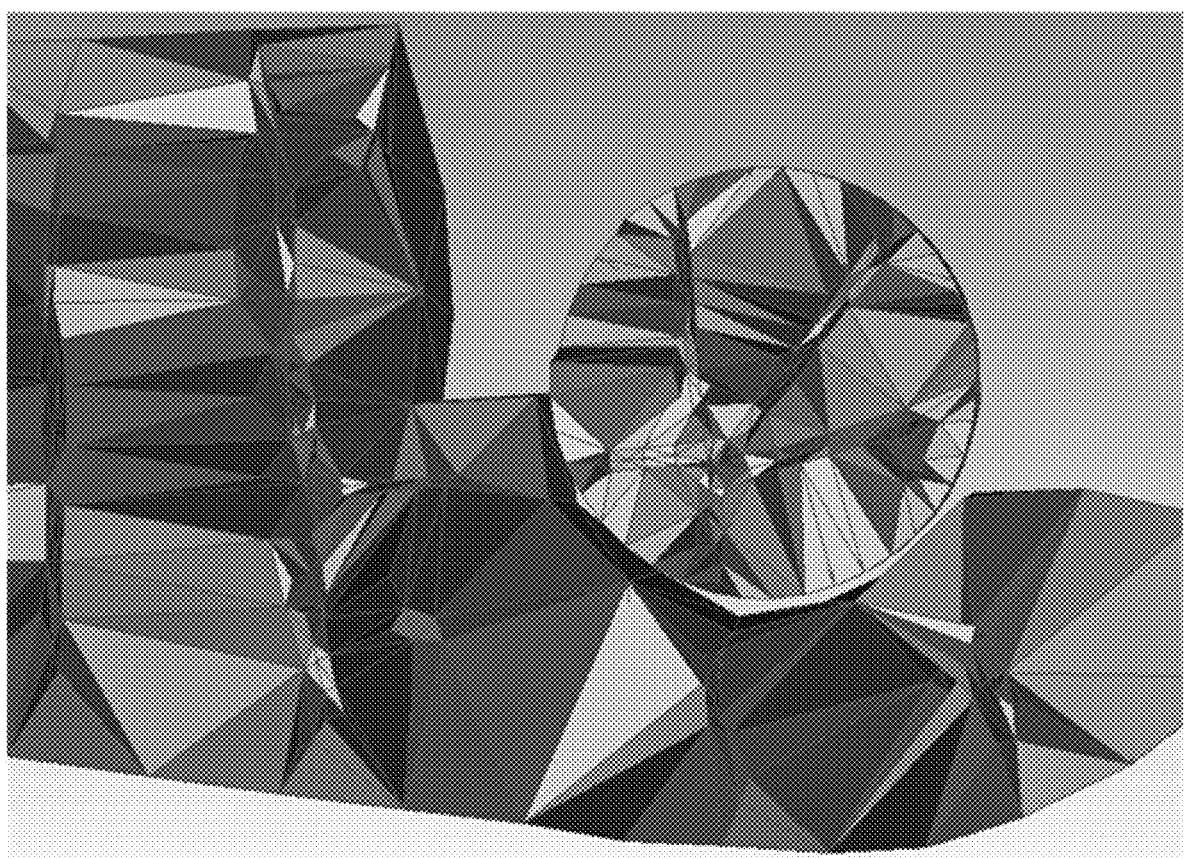
Figure 19:
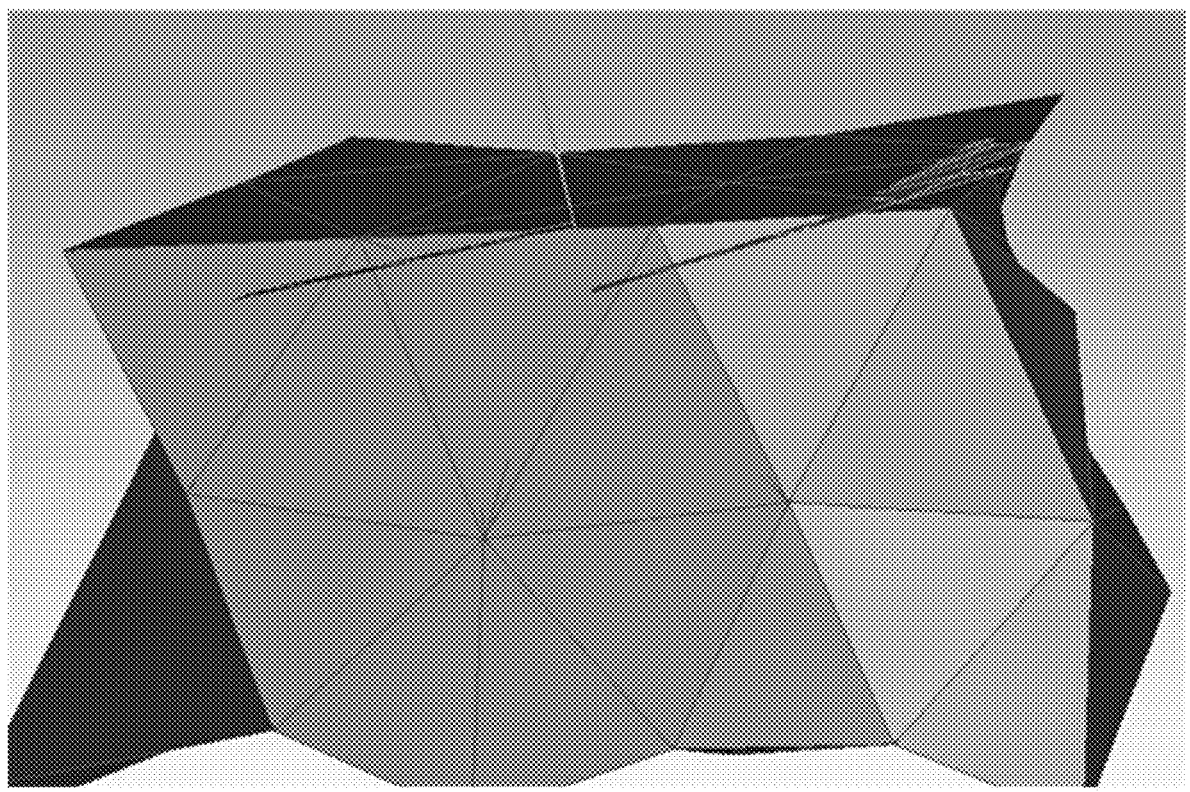
Figure 20:
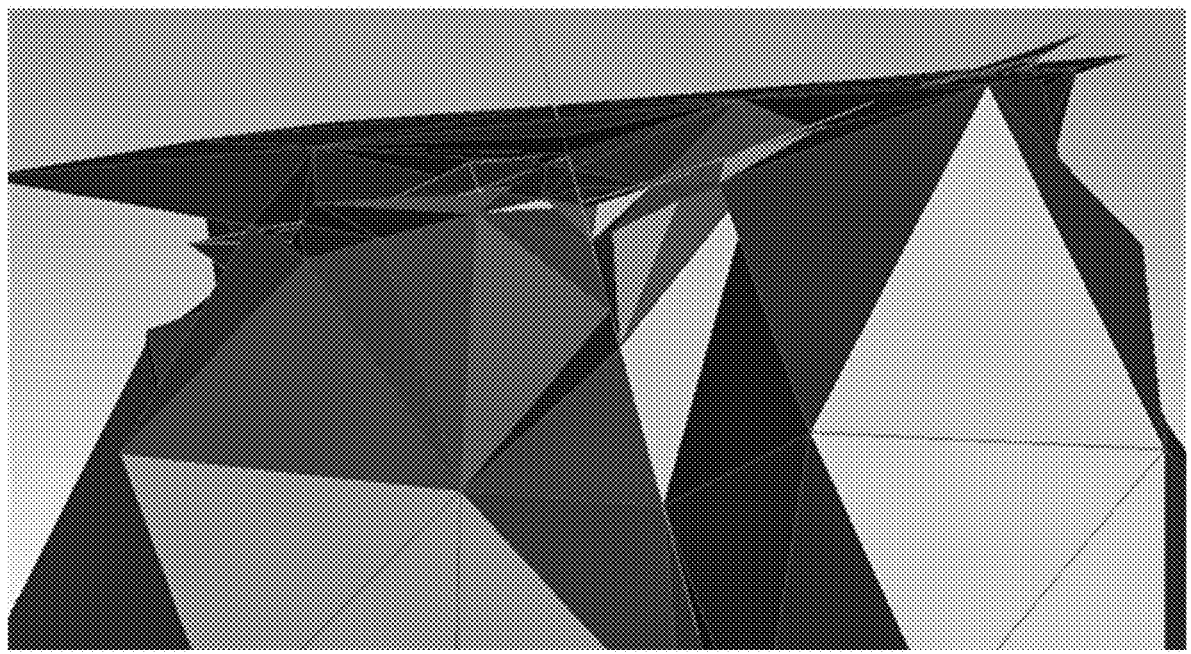
Figure 21:
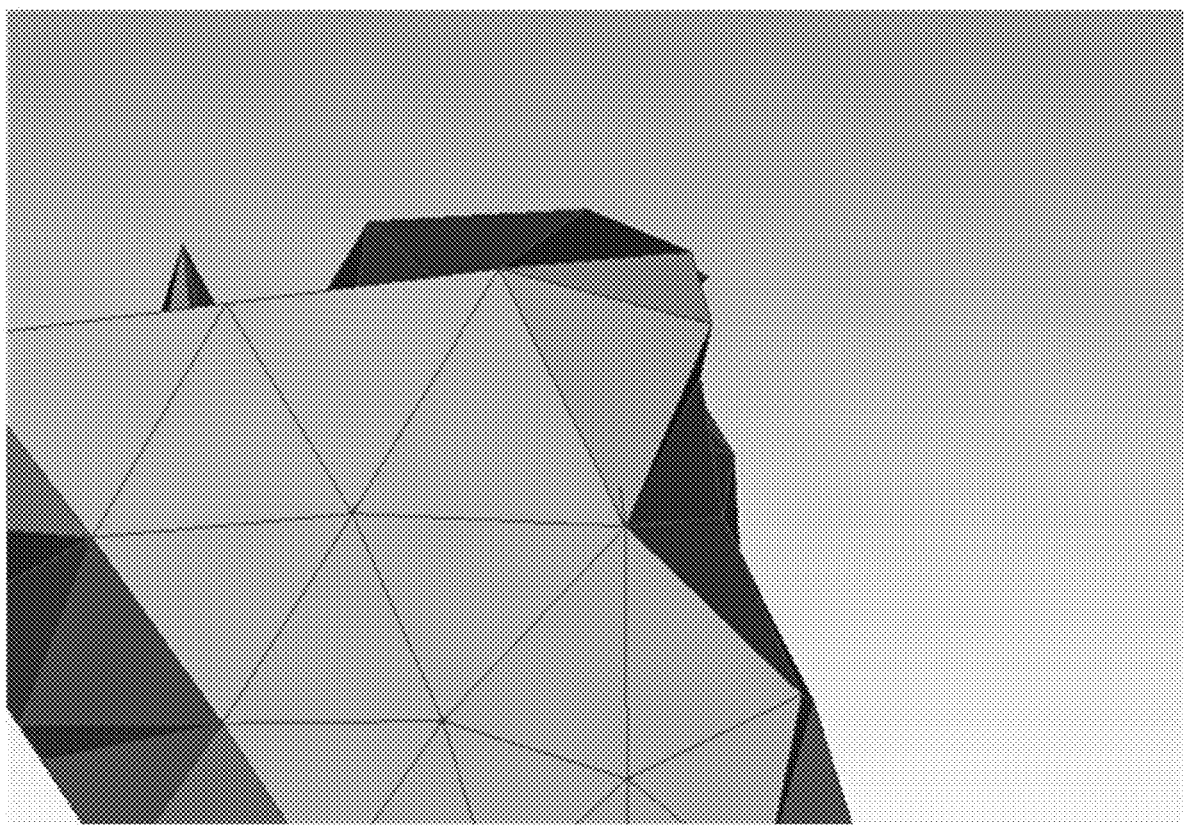
Figure 22:
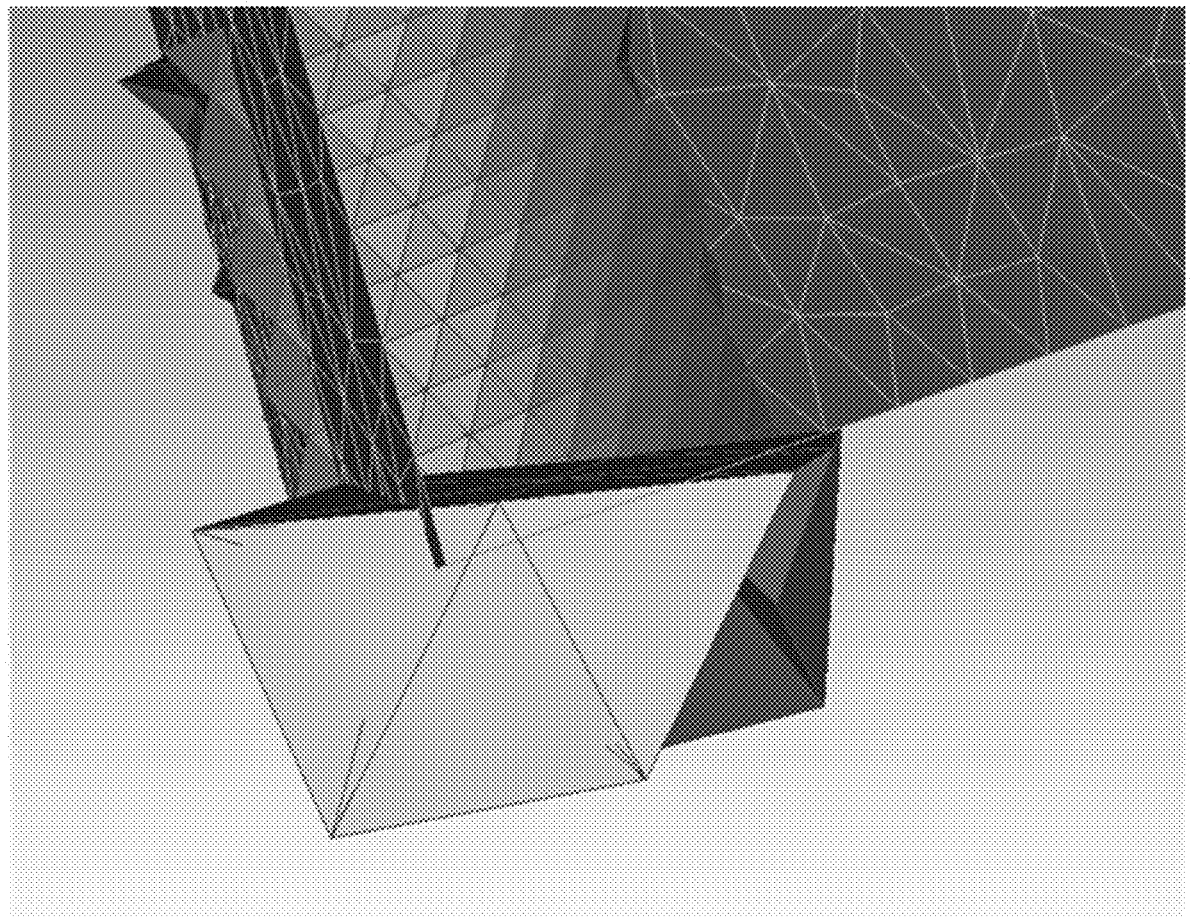
Figure 23:
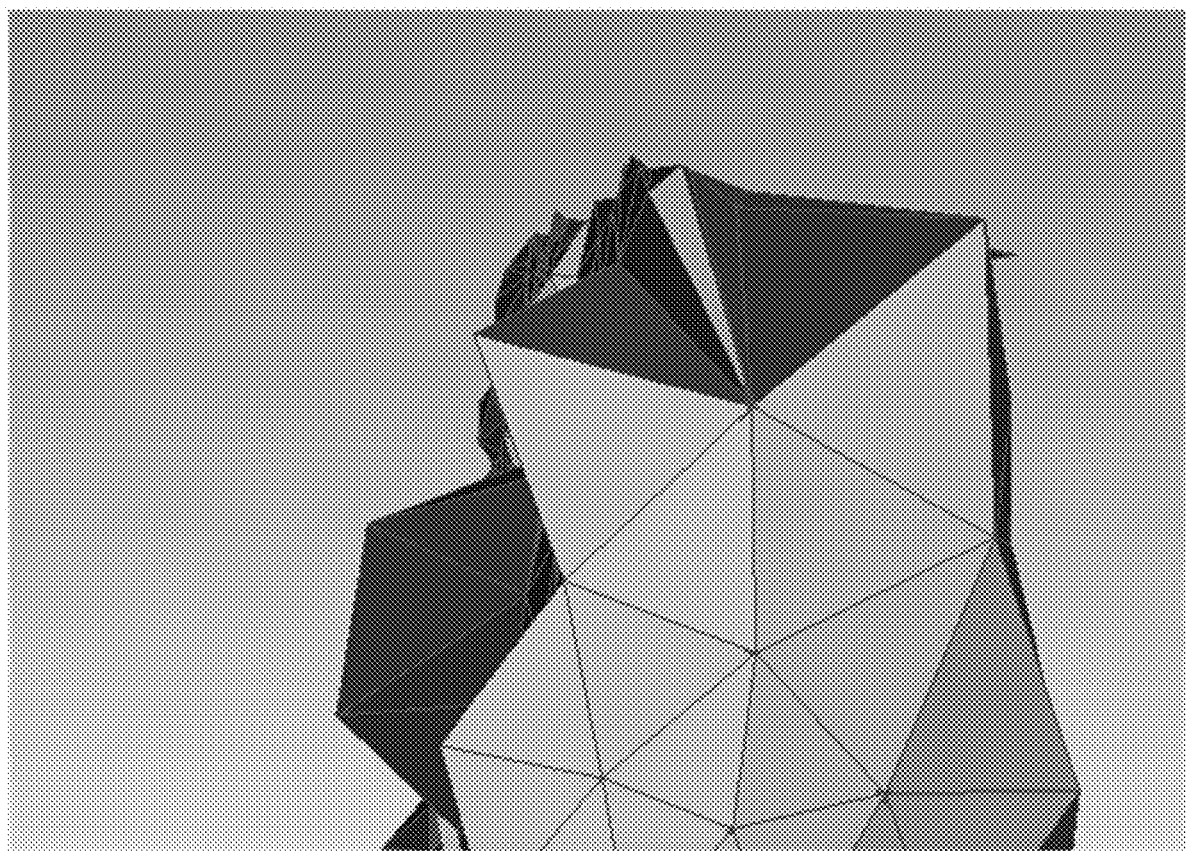

FIG. 11 shows an example of a surface mesh 500 of a three-dimensional object for which a tetrahedral mesh is to be created. The surface mesh 500 may, for example, be displayed as described above with reference to operation 202 of FIG. 2. FIG. 12 shows an example of a root box 502 enclosing the surface mesh 500 shown in FIG. 11. The root box 502 may, for example, be generated as described above with reference to operation 204 of FIG. 2. FIG. 13 shows an example of the surface mesh 500 divided into multiple partitions by subdivision planes 504. The illustrated example includes 32 partitions, which may, for example, be generated and assigned to different mesh processors for parallel processing as described above with reference to operations 206 and 208 of FIG. 2 and FIG. 10. FIG. 14 shows another view of the 32 partitions example together with the root box 502, and FIG. 15 shows a close-up view of several of the example partitions. FIG. 16 shows an example of a conformal tetrahedral mesh created for the object. The illustrated example includes gap regions that have been processed and filled with tetrahedral mesh, for example as described above with reference to operations 210, 212 and 214 of FIG. 2. Another view of the resultant conformal tetrahedral mesh is shown in FIG. 17 with partitioning detail included.

FIGS. 18-23 show close-up views of portions of the conformal tetrahedral mesh. The close-up views in FIGS. 18-23 provide examples of tetrahedral gap filling at partition boundaries.

Figure 27:
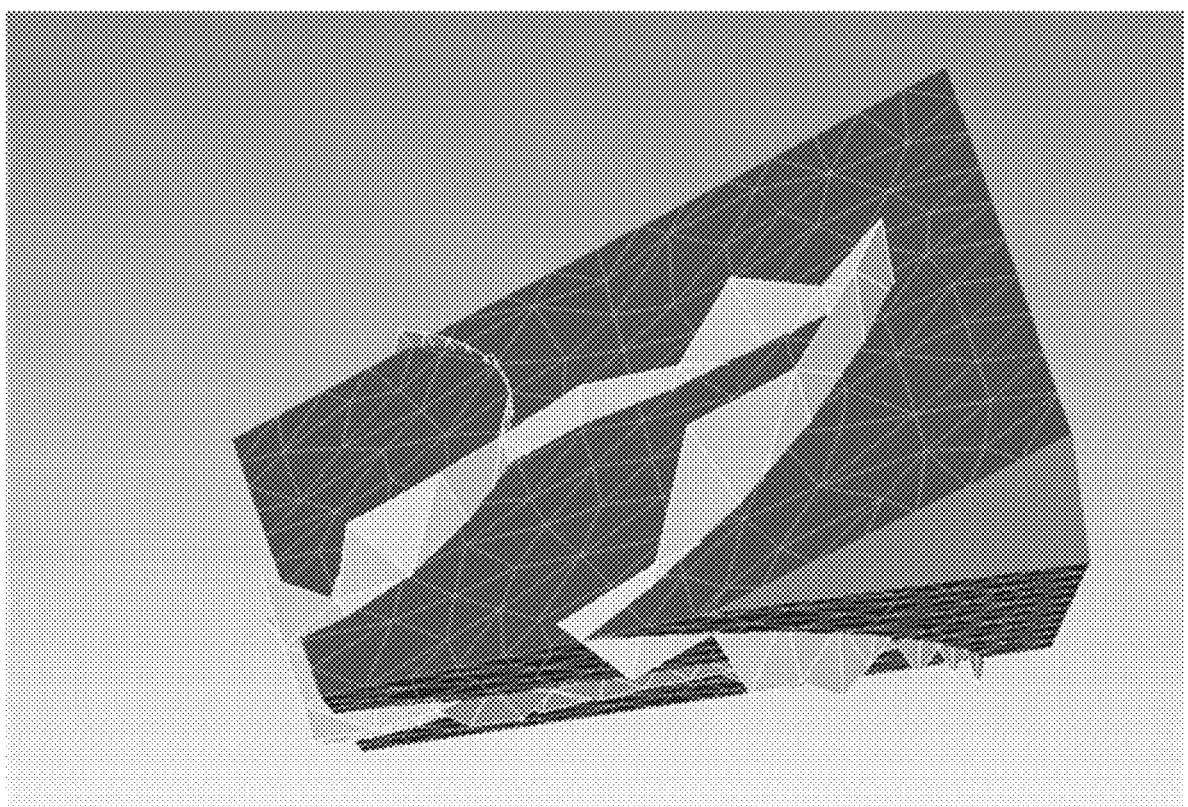
Figure 28:
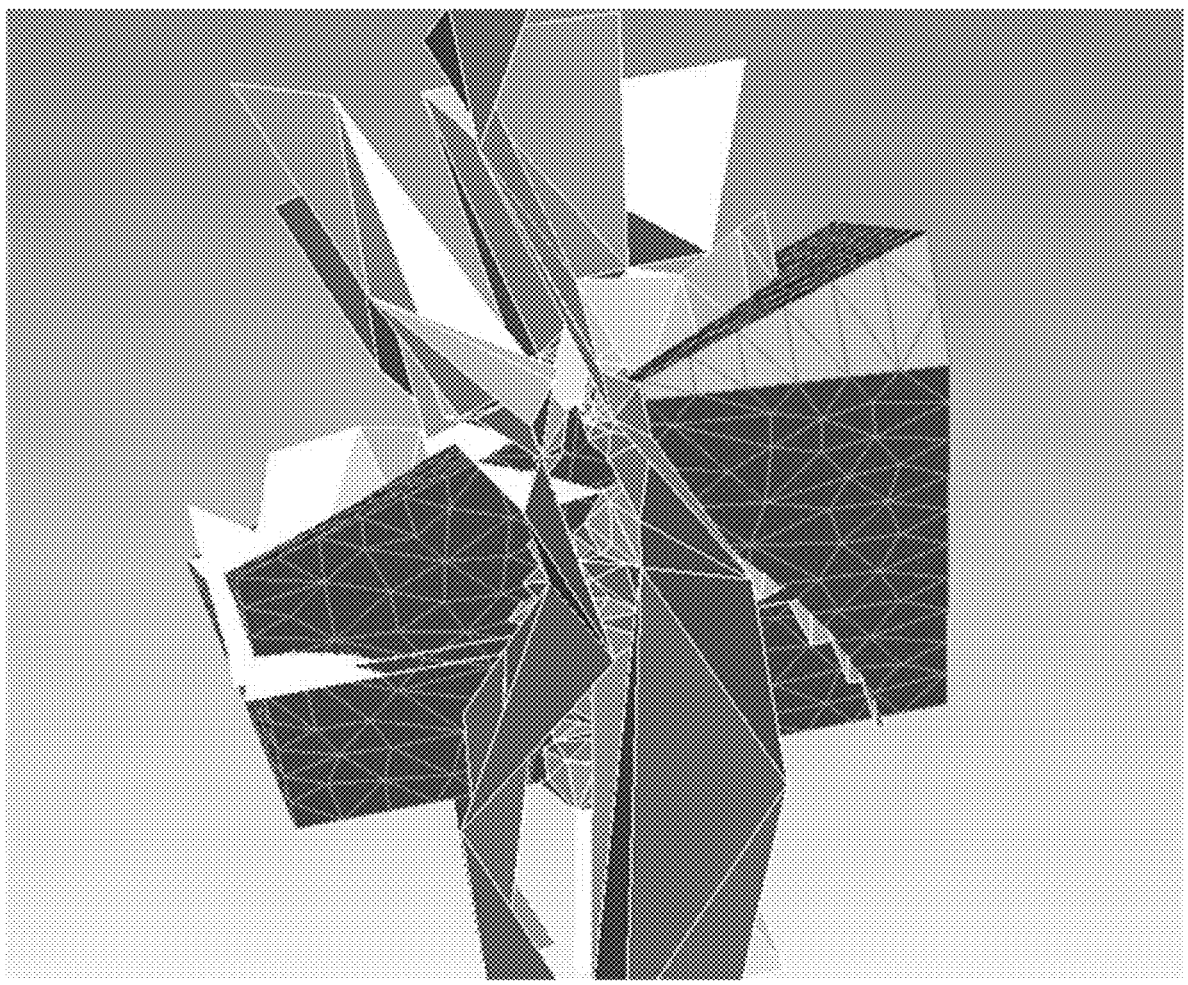
Figure 29:
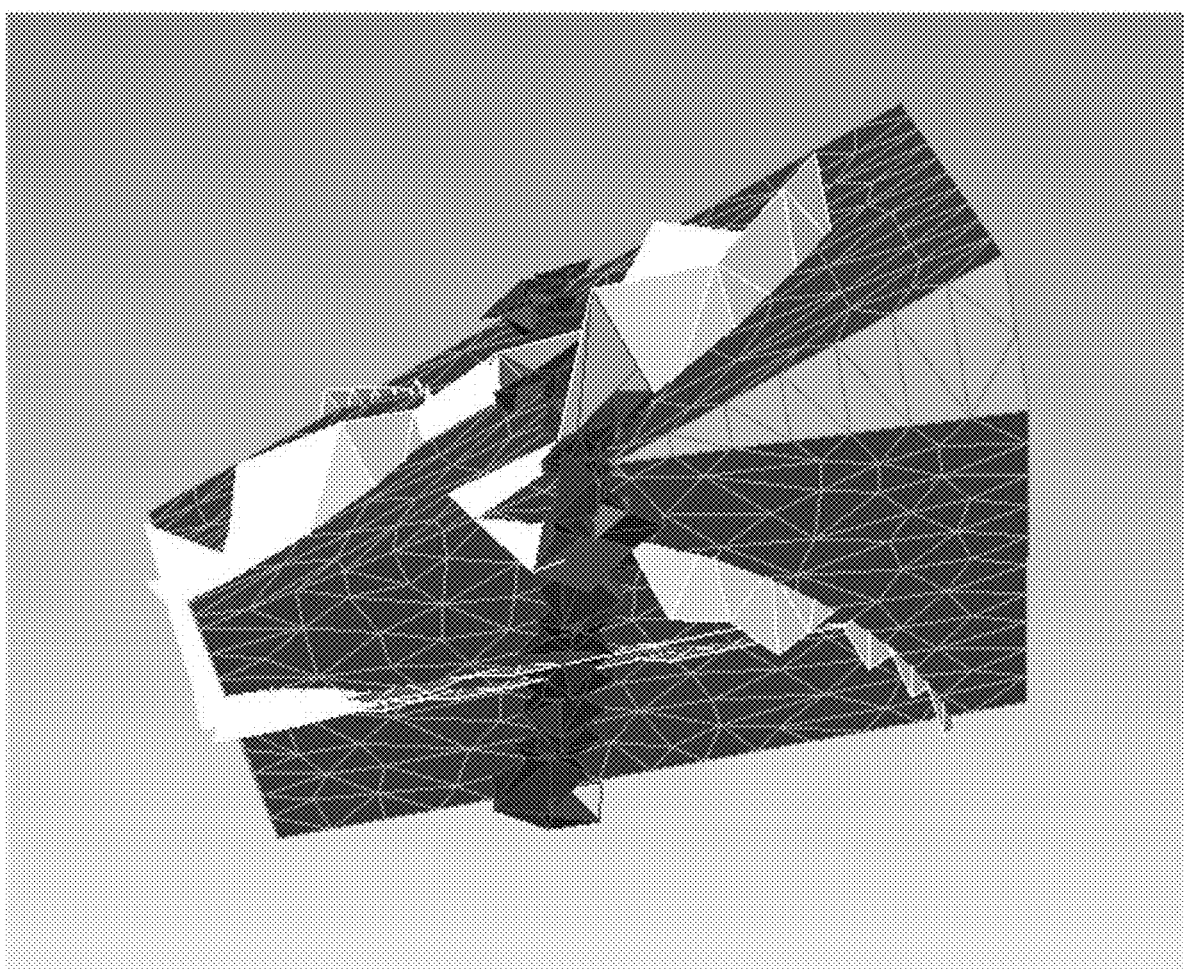
Figure 30:
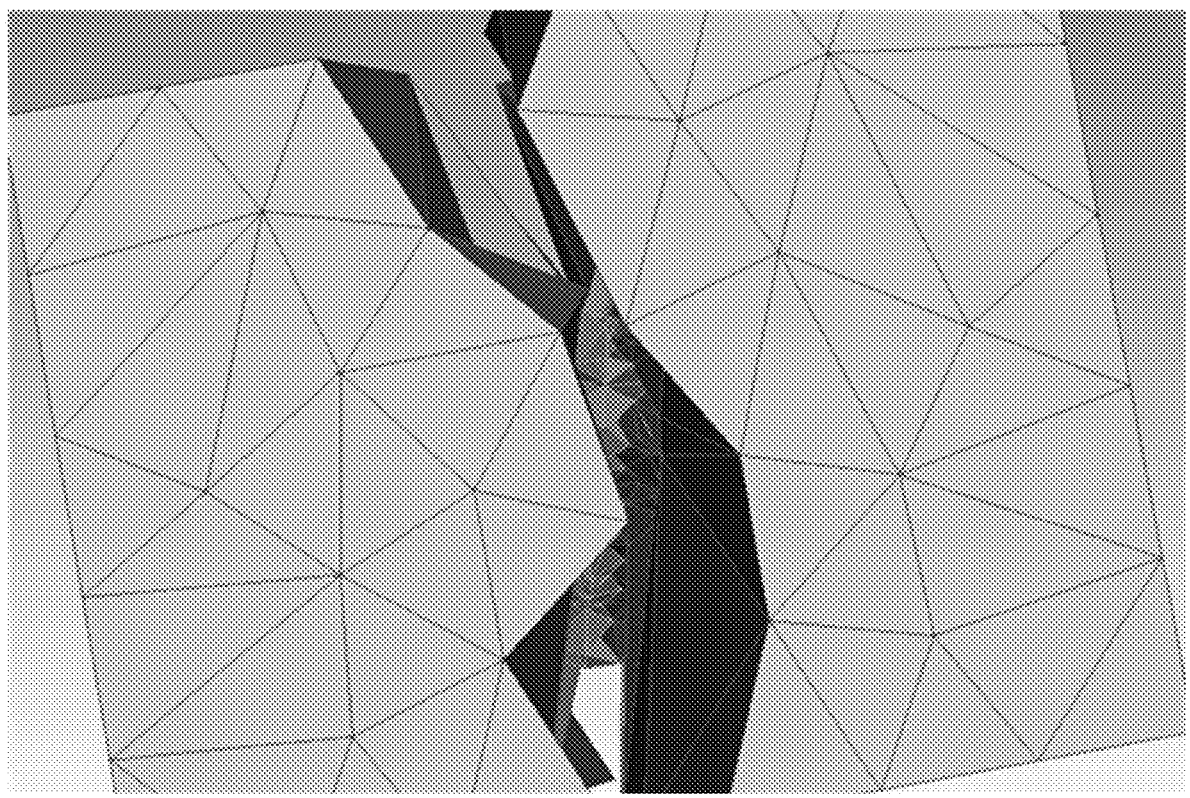
Figure 31:
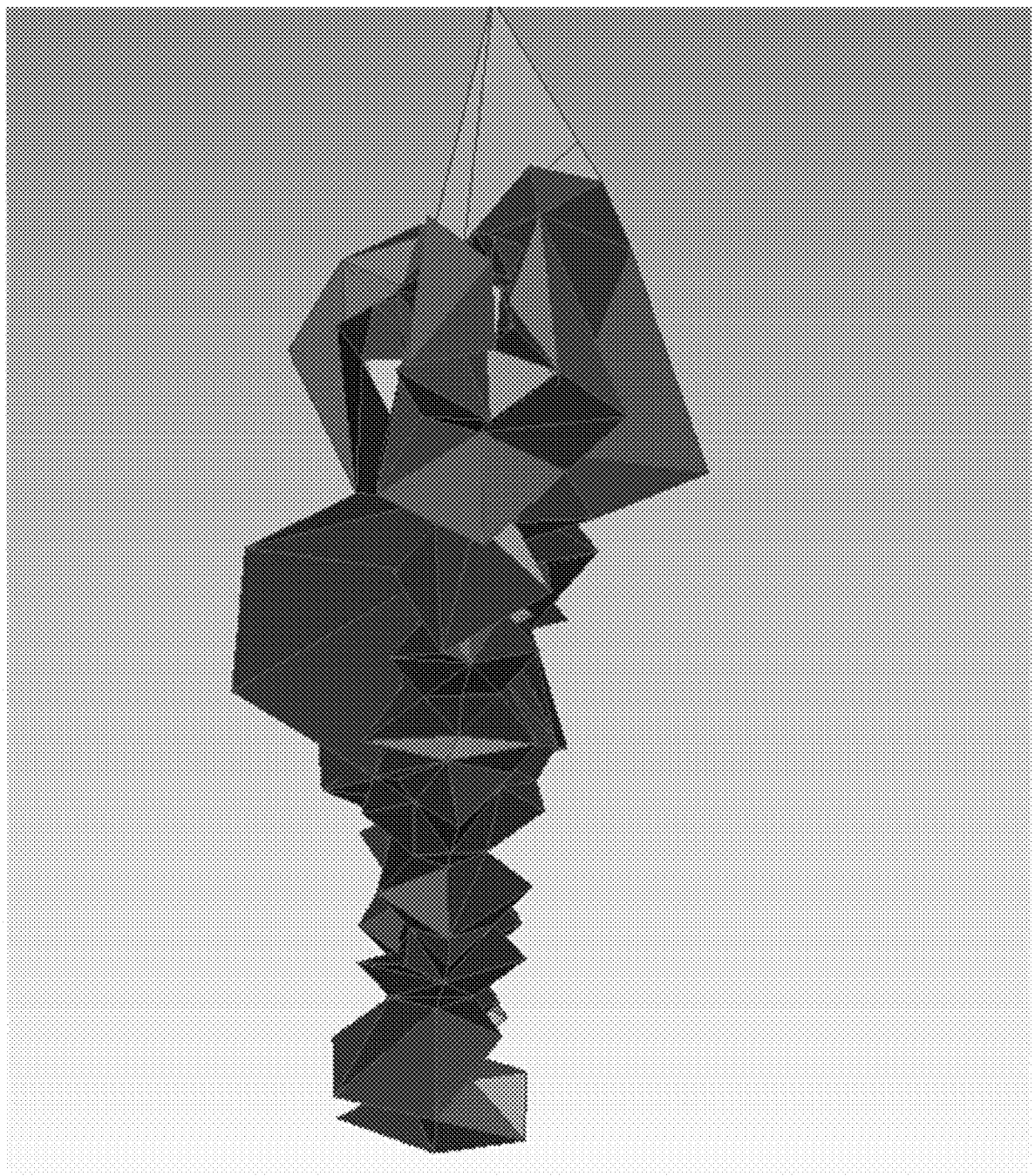
Figure 32:
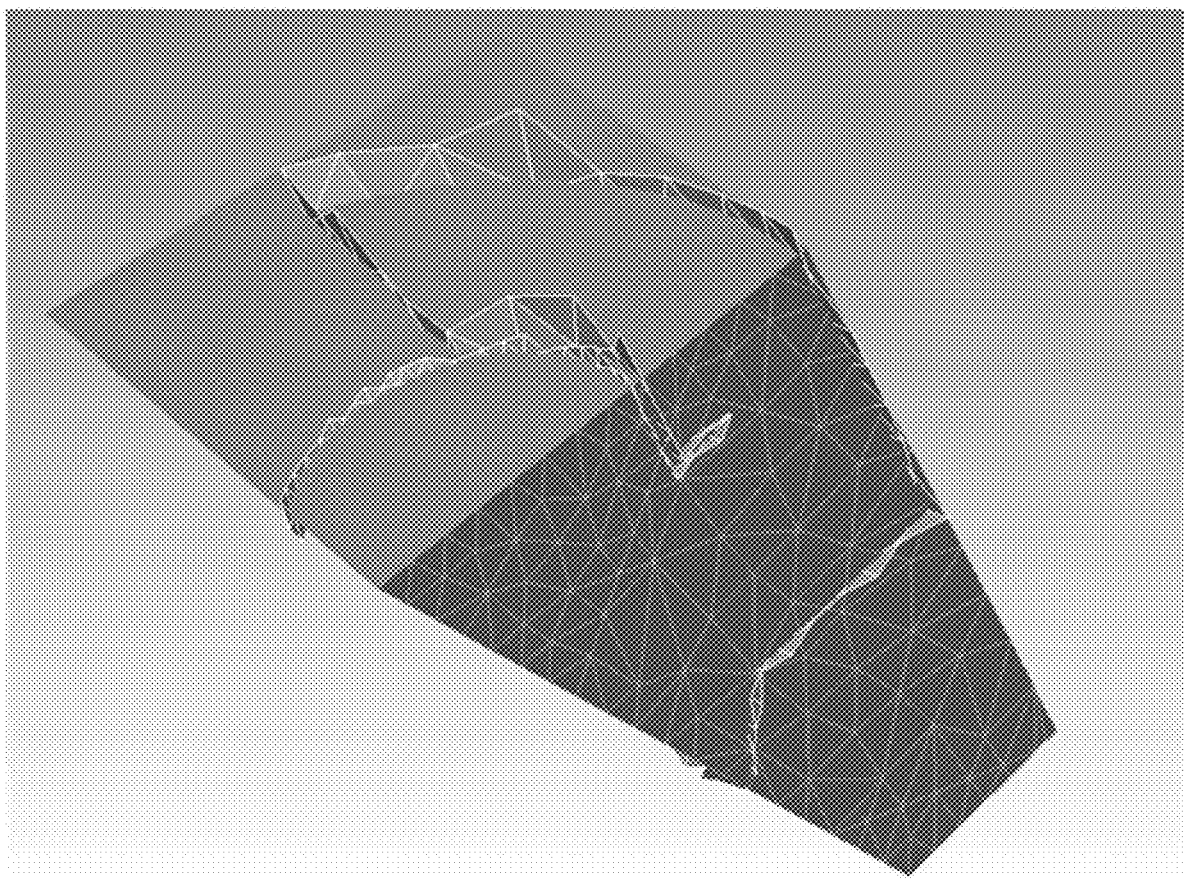

Additional examples of tetrahedral meshes that may be created using the systems and methods described herein are set forth at FIGS. 24-39. FIGS. 24-39 illustrate further examples of a gap meshing procedure. FIGS. 24-31 show examples of the connection across a partition plane shared by two partitions. FIGS. 32-29 show examples of the connection across four partitions sharing a common partition plane.

Figure 24:
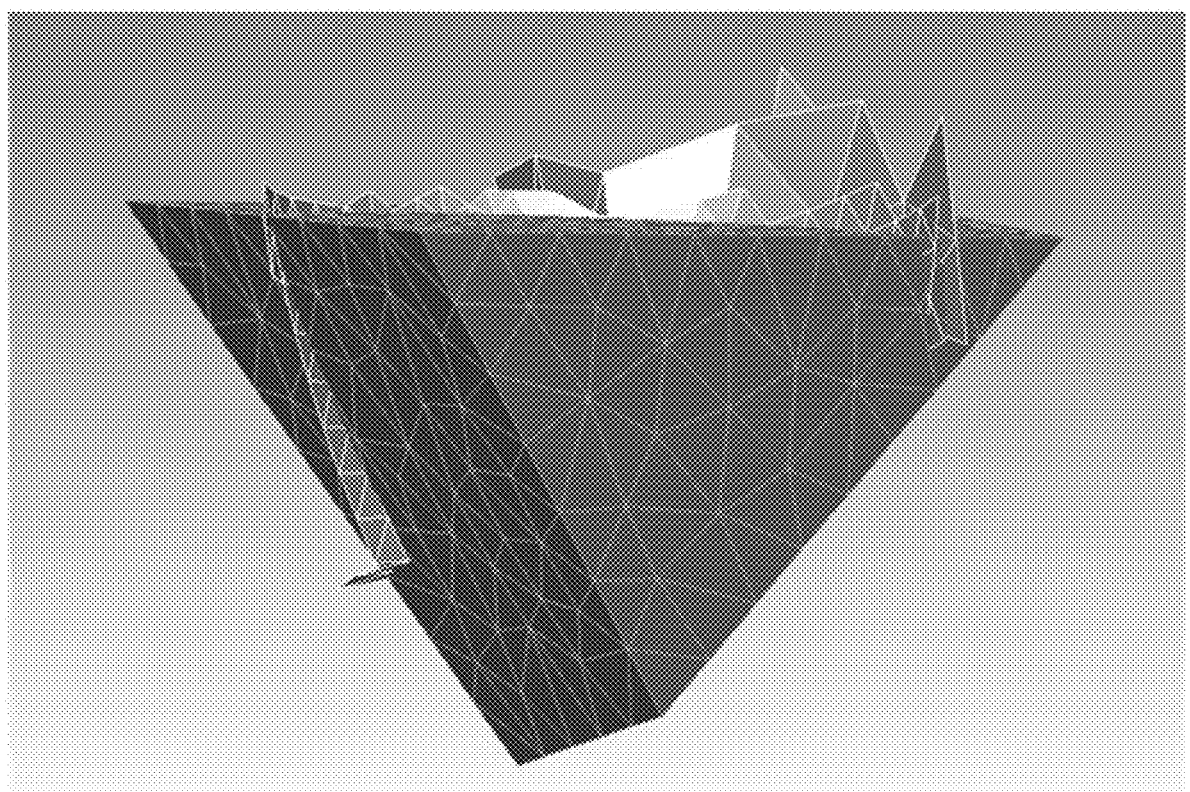
FIGS. 24-39 illustrate additional examples of tetrahedral meshes that may be created using the systems and methods described herein.
Figure 25:
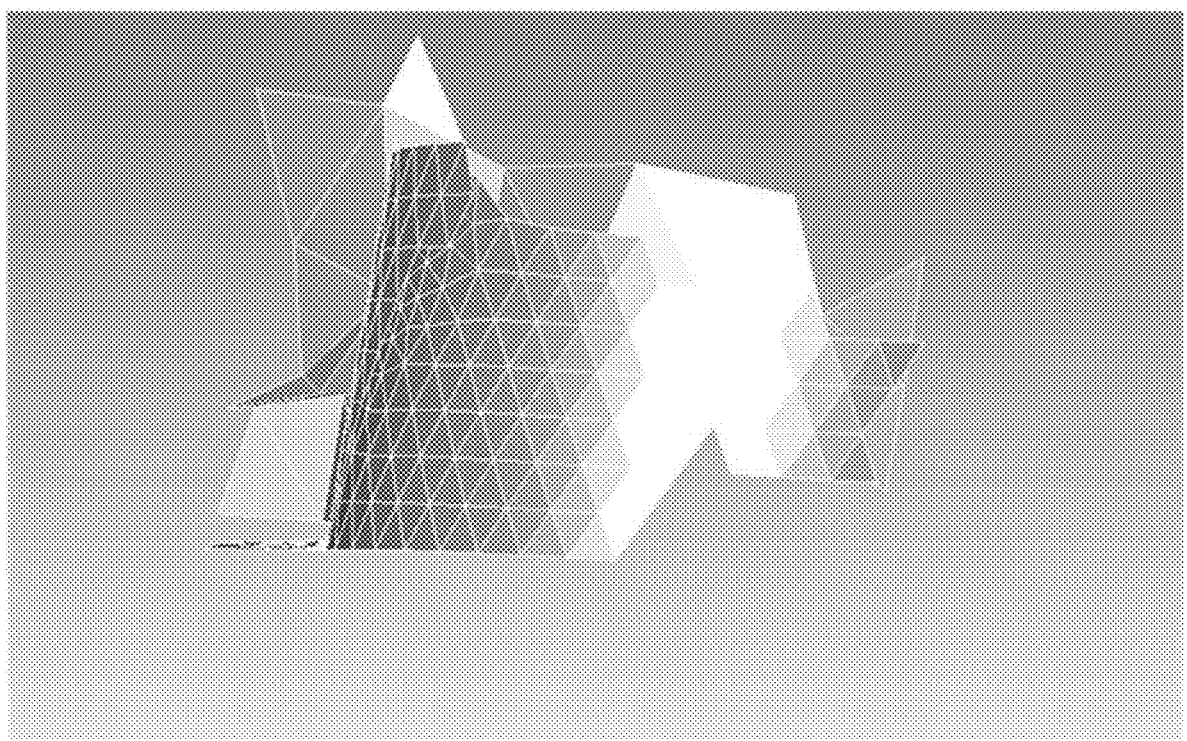
Figure 26:
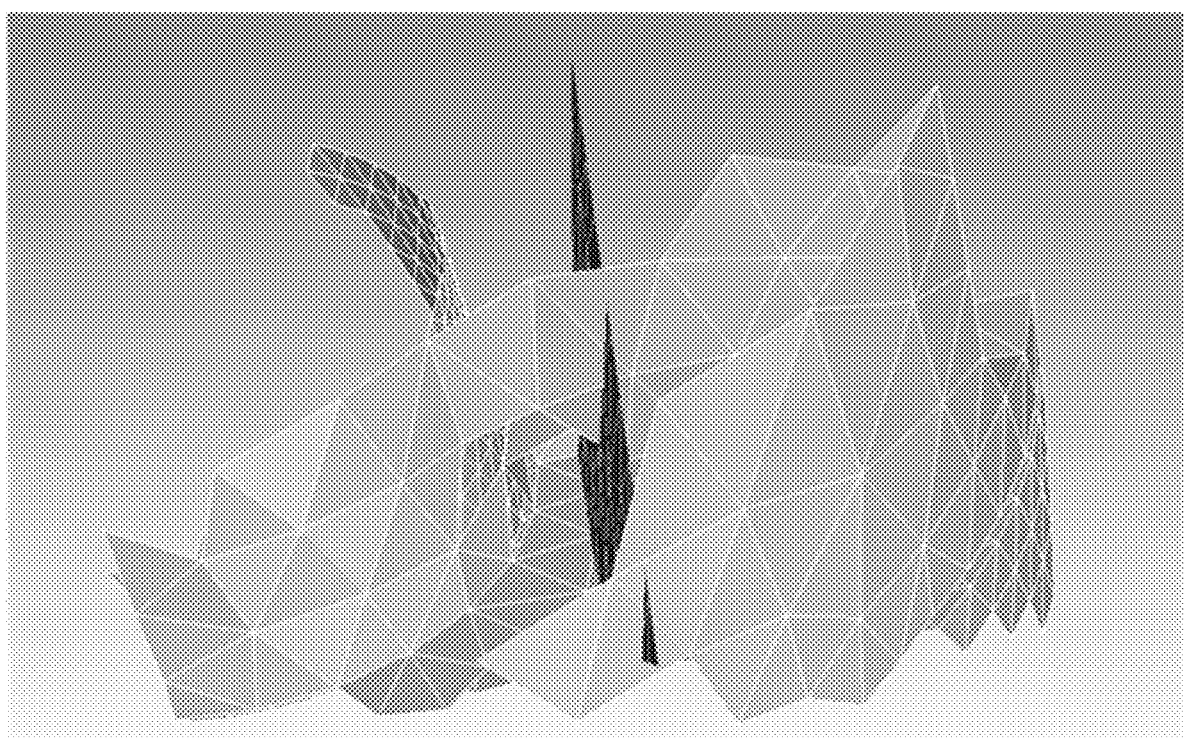

FIG. 24 shows an example of a partition (green) and triangular surface mesh extending outside of the partition (e.g., partition 308 in FIG. 6). FIG. 25 shows an example of a triangular surface mesh for a partition. FIG. 26 shows an example of a partition plane (green) separating two partitions, and triangular surface meshes in the two partitions. FIG. 27 shows an example of two partitions (green), and portions of the triangular surface mesh extending outside of the partitions. FIG. 28 shows an example of a gap region (e.g., as shown in FIG. 8) with the gap boundaries depicted by grey surfaces extending outside of the partitions. FIG. 29 shows an example of a tetrahedral mesh (black) in the gap region. Note that the mesh extends outside of the partitions (green). FIG. 30 shows an example of the gap region mesh (red), where the two partitions have been connected. The empty space shown in the gap and the gap mesh (red) define the gap region (e.g., gap region 318 in FIG. 8) that is cleared from cells of the respective partitions. FIG. 31 shows an example highlighting a tetrahedral gap mesh.

Figure 33:
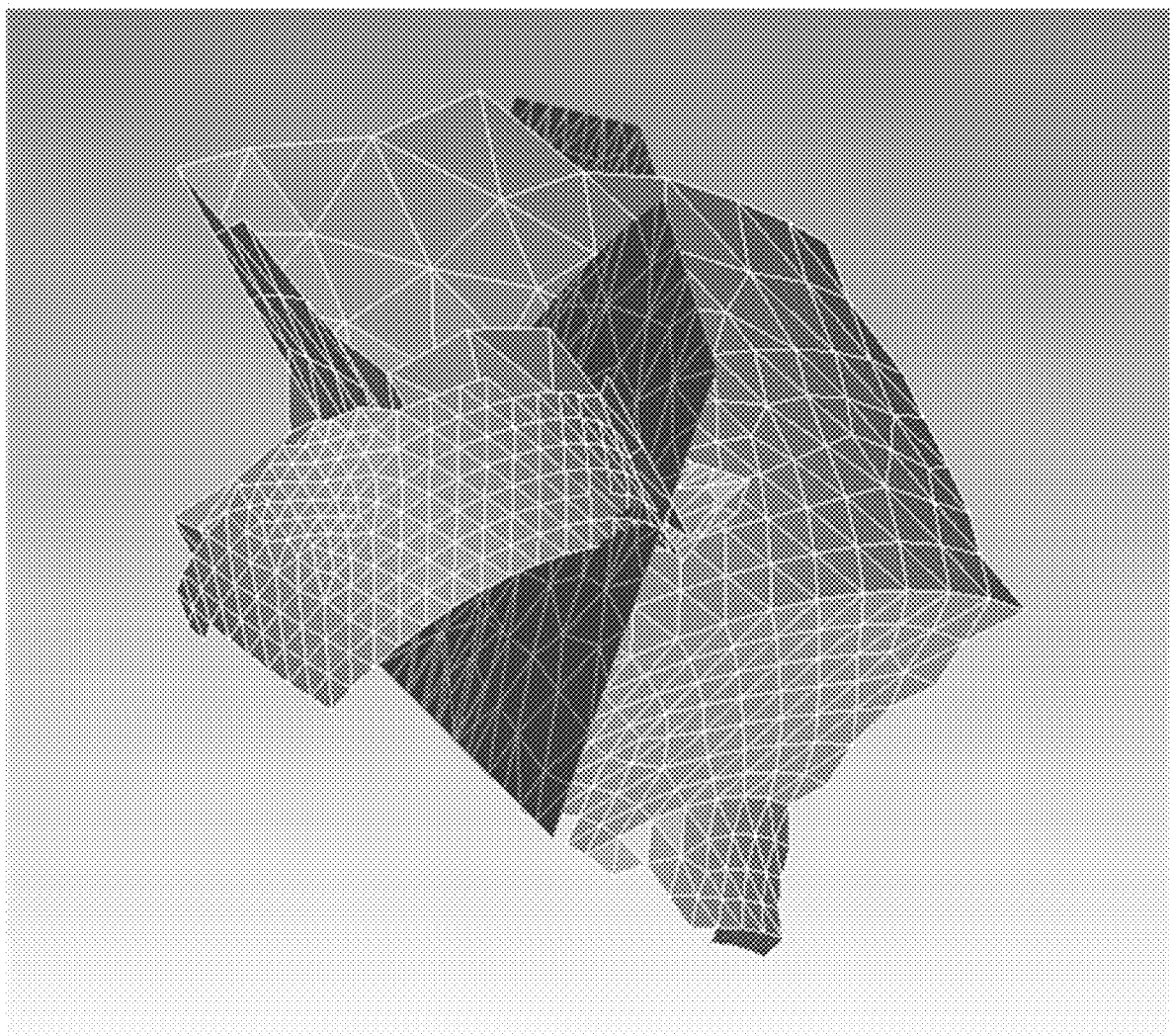
Figure 34:
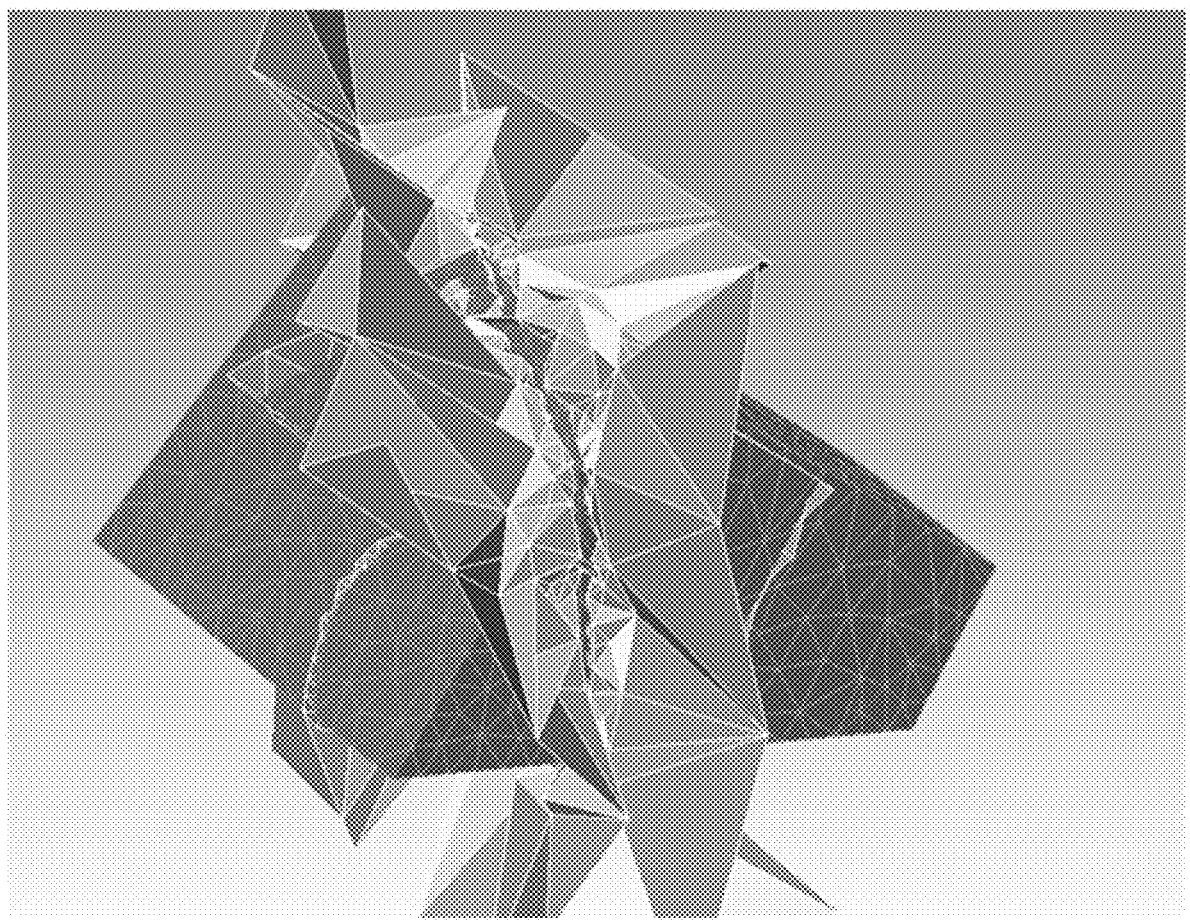
Figure 35:
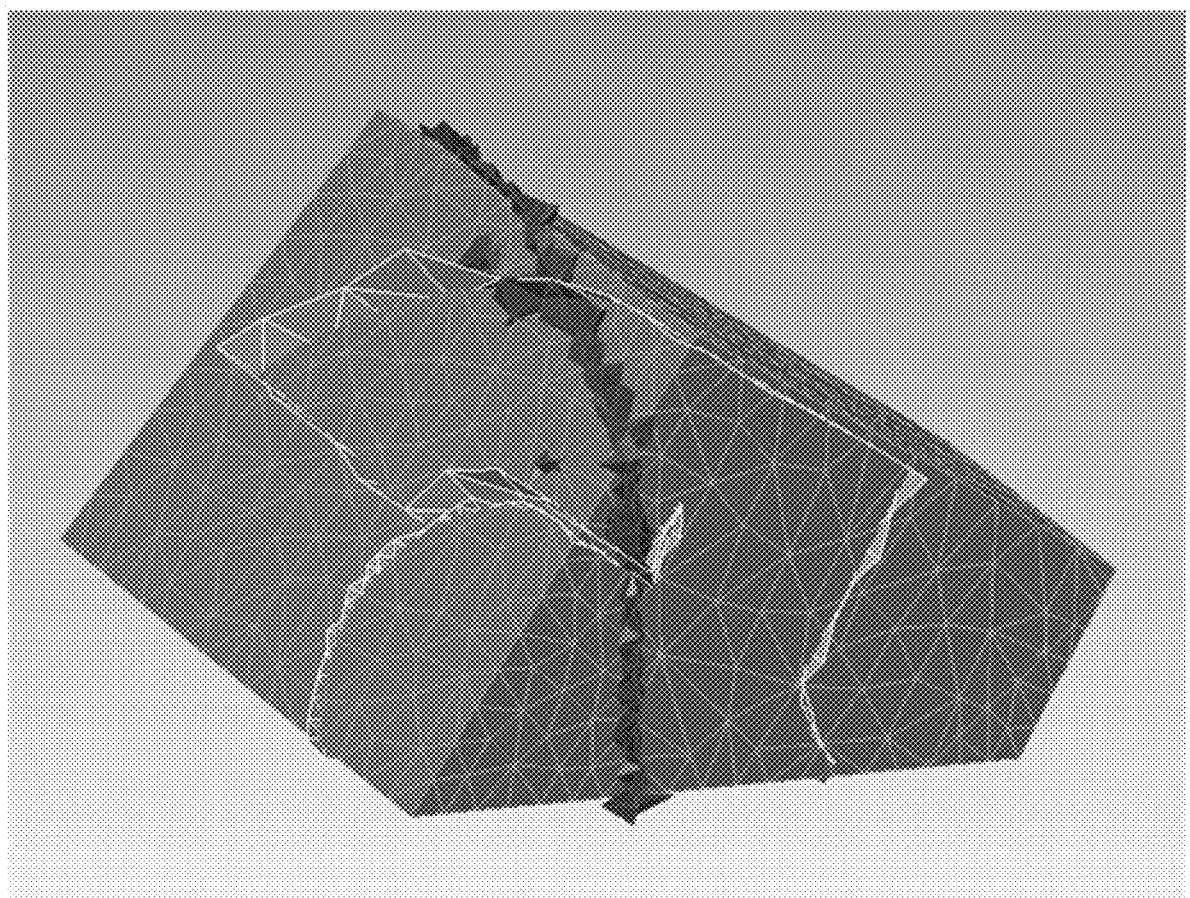
Figure 36:
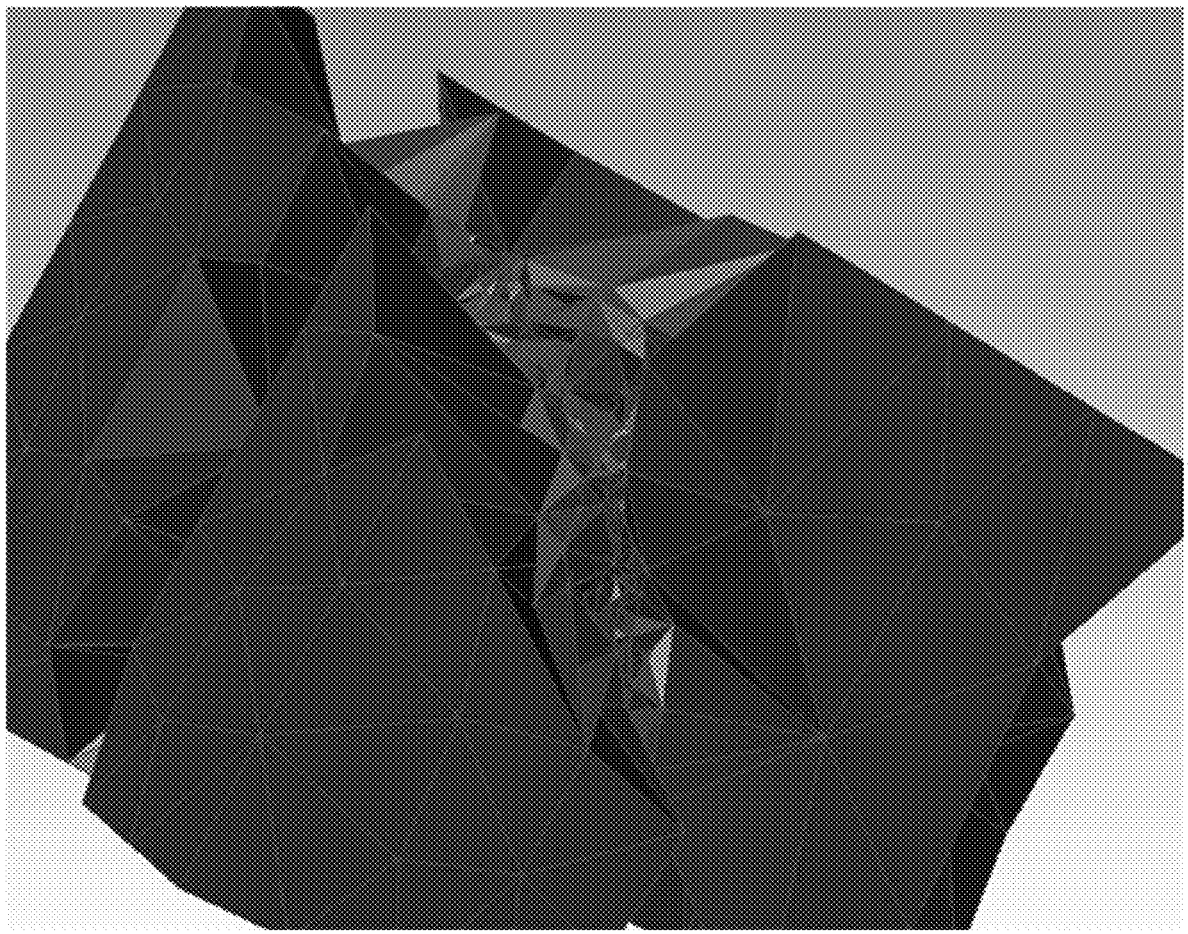
Figure 37:
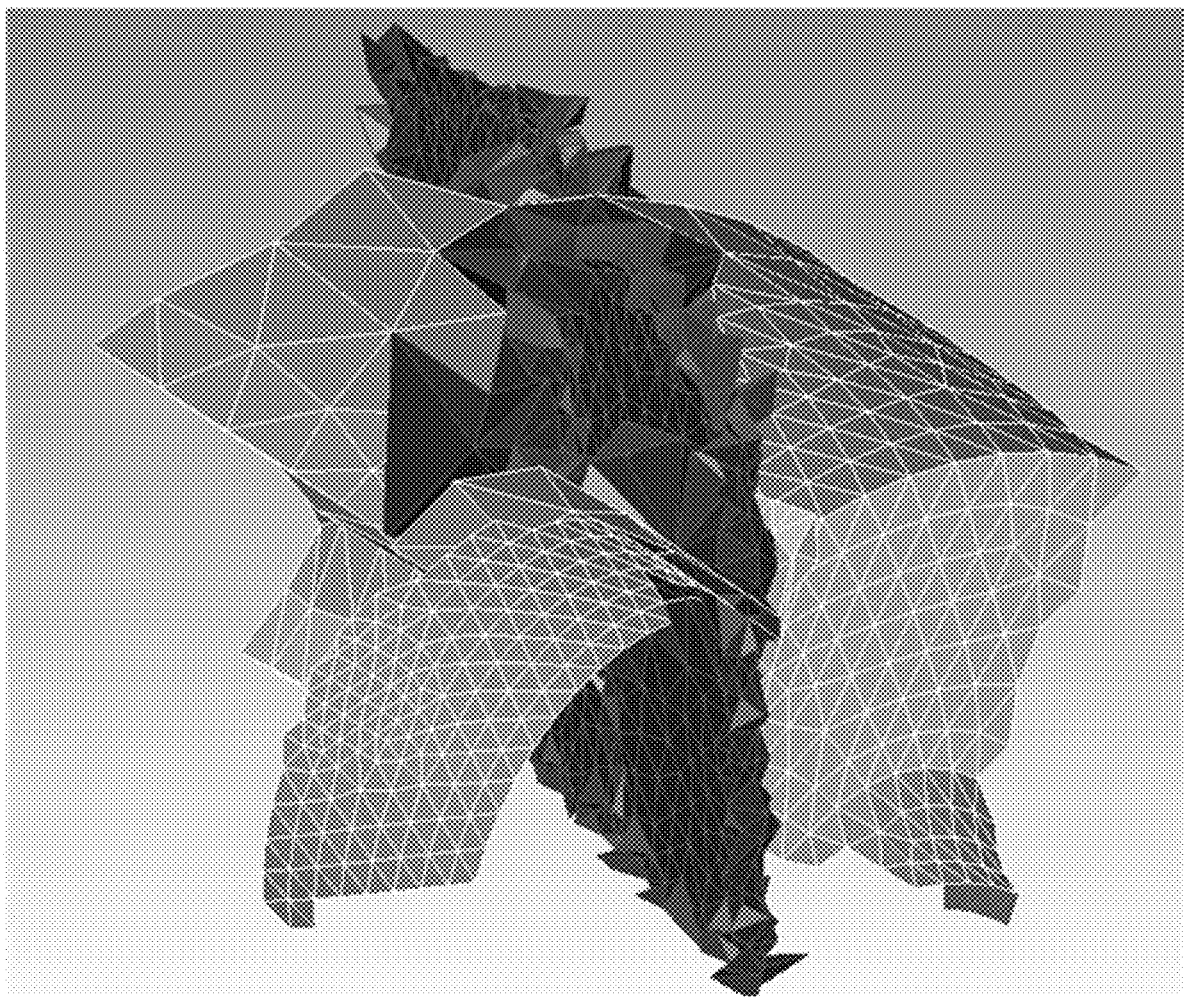
Figure 38:
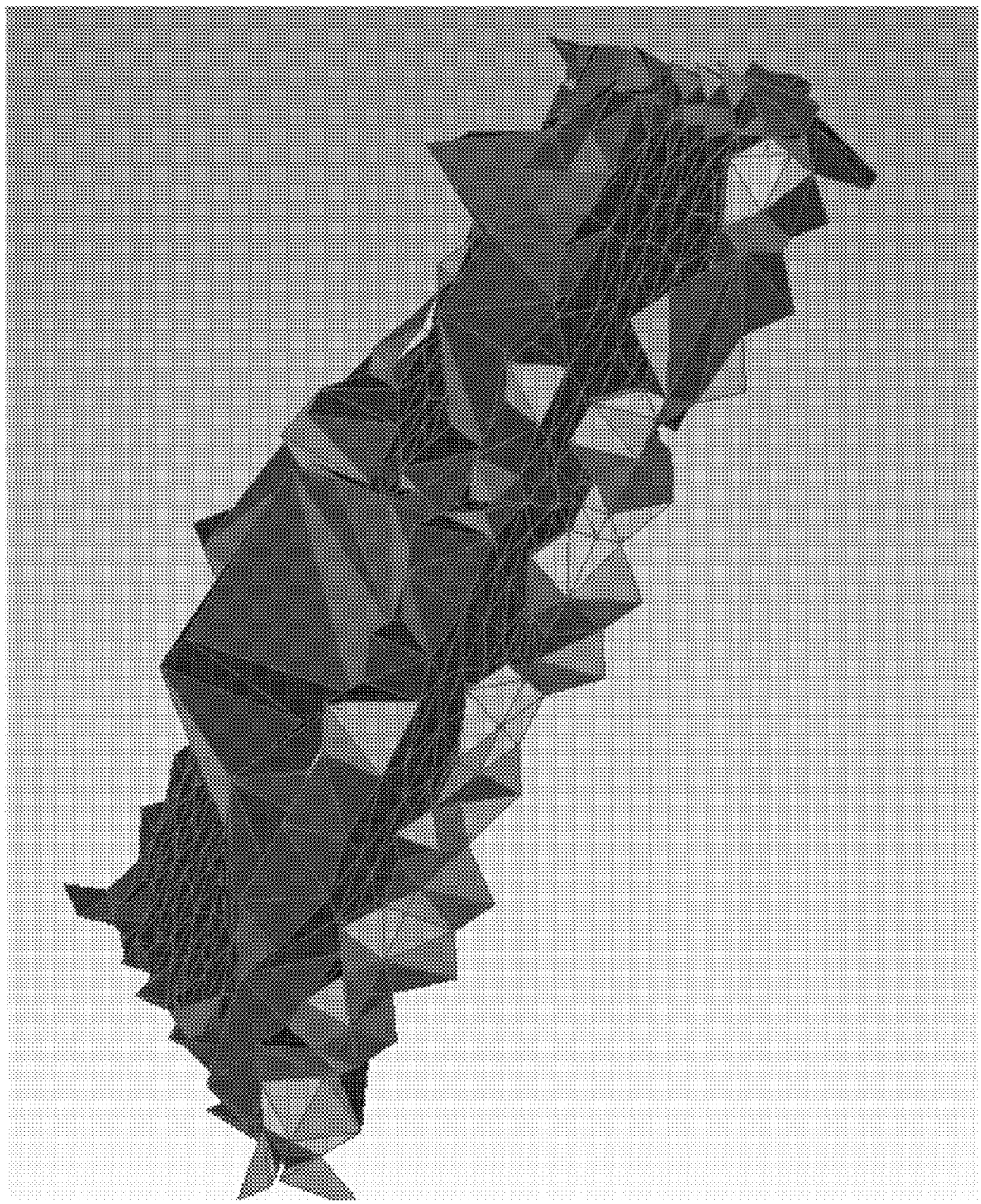
Figure 39:
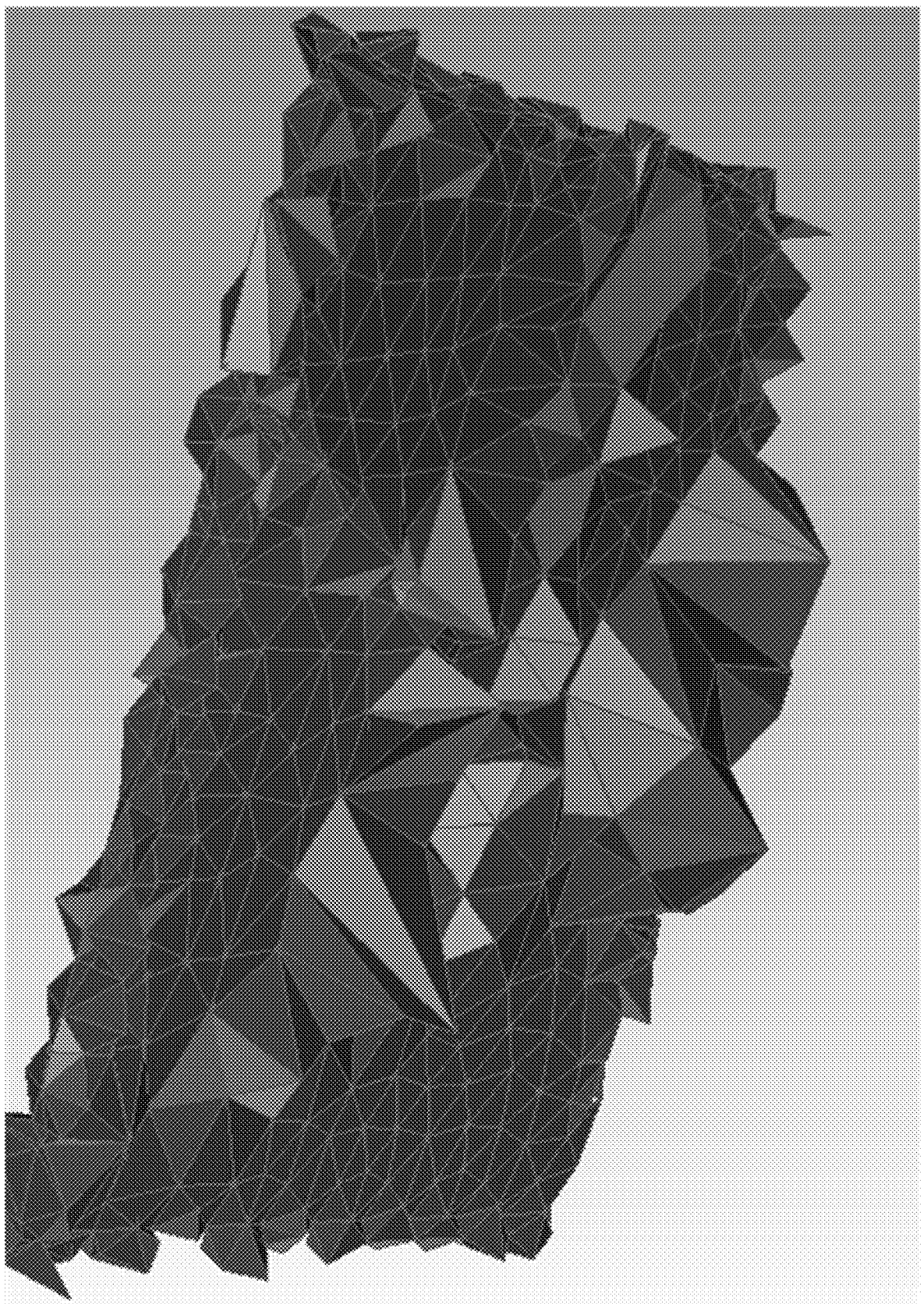

FIG. 32 shows an example of four partitions sharing a partitioning plane (i.e., a partition boundary). FIG. 33 shows an example of the partitioning plane (green) subdividing the four partitions. FIG. 34 shows an example of a gap region (grey) defined by the four partitions. FIG. 35 shows an example of a tetrahedral mesh in the gap region. Note that the mesh extends outside of the partition boundaries. FIG. 36 shows an example of a gap region mesh (blue) cleared from cells from the respective partitions. FIG. 37 shows an example of the gap mesh together with the triangular surface meshes of the four partitions. FIGS. 38 and 39 show examples of the gap mesh for the four partitions, with the coloring helping to illustrate how the tetrahedral cells in the gap region mesh may be assigned to the four partitions.

Systems and methods as described herein may be performed using a simulation engine or provide input to a simulation engine. That simulation engine may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes. The models represent behaviors of the system, while the simulation represents the operation of the system over time. A simulation result represents a characteristic of the physical system, as represented by the simulation, at one or more points within the simulation (e.g., at the end of the simulation, at t=35 seconds into the simulation).

In one embodiment, inputs to a system comprise data from measurements of an existing physical system or of a design of a physical system. In embodiments, following simulation of a physical system, the physical system is adjusted based on results of the simulation. In another embodiment, the design of a physical system to be built is adjusted based on simulation results. The physical system is then implemented or built based on the adjusted design.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of generating a tetrahedral mesh representation of a volumetric object, comprising:
   receiving, by a processor, a triangular surface mesh that defines a volumetric region;
   dividing, in response to the receiving, a root box into a plurality of partitions with subdivision planes separating adjacent partitions, the triangular surface mesh enclosed within the root box;
   assigning the plurality of partitions to different ones of a plurality of mesh processors;
   generating a tetrahedral mesh within each of the plurality of partitions;
   deleting tetrahedrals that intersect the subdivision planes separating adjacent partitions to define gap regions while retaining portions of the triangular surface mesh that intersect the subdivision planes; and
   generating a conformal tetrahedral mesh representation of the volumetric object, wherein each of the gap regions is filled with an additional tetrahedral mesh after said deleting tetrahedrals that intersect the subdivision planes and retaining the portions of the triangular surface mesh that intersect the subdivision planes.

2. The computer-implemented method of claim 1, wherein the plurality of mesh processors are used for deleting tetrahedrals that intersect the subdivision planes separating adjacent partitions to define gap regions.

3. The computer-implemented method of claim 2, wherein the generating and deleting operations are performed by the plurality of mesh processors operating in parallel.

4. The computer-implemented method of claim 2, wherein each of the plurality of partitions is assigned to a different one of the plurality of mesh processors.

5. The computer-implemented method of claim 1, wherein a subset of the plurality of mesh processors are used for filling each of the gap regions with the additional tetrahedral mesh to generate the conformal tetrahedral mesh representation of the volumetric object.

6. The computer-implemented method of claim 5, further comprising:
   transmitting information relating to the gap regions between a first subset of the plurality of mesh processors and a second subset of the plurality of mesh processors,
   wherein the information is used by the second subset of mesh processors for filling each of the gap regions with the additional tetrahedral mesh to generate the conformal tetrahedral mesh representation of the volumetric object.

7. A system for generating a tetrahedral mesh representation of a volumetric object, comprising:

a primary mesh processor, configured to
receive a triangular surface mesh that defines a volumetric region,
divide a root box into a plurality of partitions with subdivision planes separating adjacent partitions, the triangular surface mesh enclosed within the root box, and
assign the plurality of partitions to different ones of a plurality of mesh sub-processors; and
the plurality of mesh sub-processors in communication with the primary mesh processor, the plurality of mesh sub-processors configured to
receive the plurality of partitions from the primary mesh processor,
generate a tetrahedral mesh within each of the plurality of partitions,
delete tetrahedrals that intersect the subdivision planes separating adjacent partitions to define gap regions while retaining portions of the triangular surface mesh that intersect the subdivision planes, and
generating a conformal tetrahedral mesh representation of the volumetric object, wherein each of the gap regions is filled with an additional tetrahedral mesh after said deleting tetrahedrals that intersect the subdivision planes and retaining the portions of the triangular surface mesh that intersect the subdivision planes.

8. The system of claim 7, wherein a subset of the plurality of sub-processors are used for filling each of the gap regions with the additional tetrahedral mesh to generate the conformal tetrahedral mesh representation of the volumetric object.

9. The system of claim 8, wherein the plurality of sub-processors operate in parallel to generate the tetrahedral mesh within each of the plurality of partitions.

10. The system of claim 8, wherein the plurality of sub-processors operate in parallel to delete tetrahedrals that intersect the subdivision planes separating adjacent partitions.

11. The system of claim 8, wherein the plurality of mesh sub-processors are further configured to:
transmit information relating to the gap regions between a first subset of the plurality of sub-processors and a second subset of the plurality of sub-processors,
wherein the information is used by the second subset of sub-processors for filling each of the gap regions with the additional tetrahedral mesh to generate the conformal tetrahedral mesh representation of the volumetric object.

12. The system of claim 7, wherein each of the plurality of partitions is assigned to a different one of the plurality of sub-processors.

13. The system of claim 7, wherein the primary mesh processor and the plurality of mesh sub-processors communicate over one or more computer networks.

14. The system of claim 7, wherein the primary mesh processor and the plurality of mesh sub-processors are processing units within a graphical processing unit.

15. The system of claim 7, wherein the plurality of mesh sub-processors are processors within a cloud computing network.

16. A non-transitory computer-readable medium encoded with instructions for commanding one or more data processors to execute steps of a process of generating a tetrahedral mesh representation of a volumetric object, the process comprising:
receiving, by a processor, a triangular surface mesh that defines a volumetric region;
dividing, in response to the receiving, a root box into a plurality of partitions with subdivision planes separating adjacent partitions, the triangular surface mesh enclosed within the root box;
assigning the plurality of partitions to different ones of a plurality of mesh processors;
generating a tetrahedral mesh within each of the plurality of partitions;
deleting tetrahedrals that intersect the subdivision planes separating adjacent partitions to define gap regions while retaining portions of the triangular surface mesh that intersect the subdivision planes; and
generating a conformal tetrahedral mesh representation of the volumetric object, wherein each of the gap regions is filled with an additional tetrahedral mesh after said deleting tetrahedrals that intersect the subdivision planes and retaining the portions of the triangular surface mesh that intersect the subdivision planes, wherein the plurality of mesh processors are used for deleting tetrahedrals that intersect the subdivision planes separating adjacent partitions to define gap regions.

17. The non-transitory computer-readable medium of claim 16, wherein the plurality of mesh processors are used for further deleting tetrahedrals that extend beyond the plurality of partitions.

18. The non-transitory computer-readable medium of claim 17, wherein the generating and deleting operations are performed by the plurality of mesh processors operating in parallel.

19. The non-transitory computer-readable medium of claim 17, wherein each of the plurality of partitions is assigned to a different one of the plurality of mesh processors.

20. The non-transitory computer-readable medium of claim 16, wherein a subset of the plurality of mesh processors are used for filling each of the gap regions with the additional tetrahedral mesh to generate the conformal tetrahedral mesh representation of the volumetric object.

* * * * *